United States Patent [19]

Tamura

[11] Patent Number: 5,523,815
[45] Date of Patent: Jun. 4, 1996

[54] LIGHT AMOUNT CONTROL UNIT

[75] Inventor: Tomoaki Tamura, Tokyo, Japan

[73] Assignee: Konica Corporation, Japan

[21] Appl. No.: 243,392

[22] Filed: May 13, 1994

[30] Foreign Application Priority Data

May 18, 1993 [JP] Japan .................... 5-116154
May 18, 1993 [JP] Japan .................... 5-116155
May 18, 1993 [JP] Japan .................... 5-116156

[51] Int. Cl.⁶ .................. G03B 9/08; G03B 9/02
[52] U.S. Cl. .............. 354/233; 354/227.1; 354/234.1; 354/271.1; 359/228
[58] Field of Search .................... 354/457, 233, 354/227.1, 234.1, 271.1, 195.11, 274; 359/228

[56] References Cited

U.S. PATENT DOCUMENTS 2,481,660  9/1949  Harrison .
3,445,166  5/1969  Kloven .
3,638,550  2/1972  Hereford .
4,390,240  6/1983  Bookbinder .
4,695,144  9/1987  Yoshino et al. .
4,793,689  12/1988  Aoyagi et al. .
4,884,090  11/1989  Tanaka et al. .
5,218,258  6/1993  Shirasa et al. .
5,337,110  8/1994  Dowe .

Primary Examiner—Howard B. Blankenship
Assistant Examiner—Daniel Chapik
Attorney, Agent, or Firm—Jordan B. Bierman; Bierman and Muserlian

[57] ABSTRACT

A mechanism to regulate a light amount passing through a lens comprises a lens rotatable around the rotation axis thereof, a driver to rotate the rotatable lens; a regulator having an adjustable aperture through which a light amount passing through the rotatable lens is regulated; and a linkage to link the rotatable lens and the regulator, whereby the regulator changes the size of the adjustable aperture in accordance with a rotated position of the rotatable lens.

13 Claims, 24 Drawing Sheets

LIGHT AMOUNT CONTROL UNIT

BACKGROUND OF THE INVENTION

The present invention relates to a light amount control unit, and more particularly relates to a compact light amount control unit.

A conventional light amount control unit for use in a photographing apparatus is disclosed in Japanese Patent Publication Open to Public Inspection No. 56934/1992 or Japanese Utility Model Publication Open to Public Inspection No. 6710/1987.

As shown in FIGS. 18 and 19, a conventional light amount control unit, that is, a shutter unit includes a pair of light shielding blades 21, 22 which correspond to light amount control members. The pair of light shielding blades 21, 22 are disposed between a front lens group 23 and rear lens group 24, and the lens aperture is opened and closed by the pair of light shielding blades 21, 22. The front lens group 23 is supported by a front lens barrel 25, and the rear lens group 24 is supported by a rear lens barrel 26. A flange is attached onto the end surface of each of the front and rear lens barrels 25, 26, so that the flange of the front lens barrel 25 and that of the rear lens barrel 26 are opposed to each other. When the flanges are joined, a shutter chamber 27 is formed. A pair of light shielding blades 21, 22 are accommodated in this shutter chamber 27. In this way, what is called a between-shutter is composed. The light shielding blades 21, 22 are pivotally supported by a pin 28 disposed in the periphery of the light shielding blades.

In this case, a well-known shutter drive unit 30 is mounted on the outer periphery of the rear lens barrel 26. The light shielding blades 21, 22 are opened and closed by the shutter drive unit 30 in the following manner:
Oblique grooves (not shown) are formed on the pair of light shielding blades 21, 22 which are pivotally supported by the front and rear lens barrels 25, 26. These oblique grooves are directed in an opposite direction to each other. When a drive shaft 31 of the drive unit 30 is slidably engaged with the grooves and rotated, the light shielding blades 21, 22 are opened and closed.

At present, there is a tendency that the size and weight of a lens unit are reduced. Accordingly, it is necessary to reduce the size and weight of a light amount control unit which controls an amount of light incident on a lens group.

In a conventional light amount control unit, thickness of the light shielding blade is reduced for the purpose of reducing the weight. However, it is necessary to provide a sliding and engaging member 35 which drives the light shielding blades. Therefore, a space is required for installing the sliding and engaging member 35. For this reason, it is difficult to reduce the size of the conventional light amount control unit.

The present invention has been achieved in view of the above circumstances. The first object of the present is to provide a compact light amount control unit in which a space for accommodating the drive mechanism of the sliding and engaging member is eliminated when the light amount control member is activated through the lens.

Recently, lenses are manufactured by means of injection molding, and aspherical or non-symmetrical lenses are made of mold glass.

The present invention has been achieved in view of the above circumstances. The second object of the present invention is to provide a compact optical system control unit for camera use in which the lens is utilized as parts for controlling a light amount, and a progressive wave type motor and microactuator are used for the drive means.

According to Japanese Patent Publication Open to Public Inspection No. 56934/1992, in order to solve the problems of the aforementioned light amount control unit in which mechanical light shielding blades are used, a light amount control unit in which light shielding fluid is used is proposed.

This light amount control unit is constructed in the following manner:
The light amount control unit includes: a lens group; a lens barrel to support the lens group; a closed chamber surrounded by the lenses and side walls of the lens barrels; and a suction and discharge pump for sucking and discharging light shielding fluid from the closed chamber through a sucking and discharging pipe, wherein the area of a light transmitting portion formed at the center is increased and decreased using a surface tension of the light shielding fluid accommodated in the closed chamber, so that an amount of light can be controlled.

However, in the aforementioned light amount control unit in which light shielding fluid is used, the following problems may be encountered:
It is necessary to install a sucking and discharging pump and a drive unit for driving the pump, at a position outside the lens unit. Accordingly, it is difficult to reduce the size of the entire unit, and further the costs are raised.

The present invention has been achieved in view of the above circumstances. The third object of the present invention is to provide a light amount control unit used for a camera in which an amount of light is controlled by light shielding fluid, and the size and cost of the light amount control unit can be reduced.

SUMMARY OF THE INVENTION

In order to accomplish the first object, the present invention is to provide a light amount control unit including:
a lens group; a support member for supporting the lens group; a light amount control member for controlling an amount of light incident on the lens group; a rotating means for rotating a predetermined lens; and a link means for linking the rotation of the lens with the opening and closing motions of the light amount control member.

An amount of light incident on the lens group supported by the support member is controlled by the light amount control member. In this case, a predetermined lens is rotated by the rotating means. According to the construction described above, rotation of the lens is linked with opening and closing motions of the light amount control member.

For example, the light amount control member is driven through a predetermined lens rotated from the outside of the support member. Therefore, it is not necessary to provide a drive mechanism such as a sliding and engaging member of the light amount control unit.

The first optical system control unit to accomplish the second object of the present invention will be described as follows:
In a camera in which a light amount control unit member is disposed on an optical axis of the lens, at least one piece of lens is rotatably supported so that it can be rotated around the optical axis, and there is provided a link means for linking the lens with the light amount control means, wherein a light amount can be controlled when the light amount control member is driven through the link means by the rotation of the lens around the optical axis. Further, there is provided a lens drive means for rotating the lens around the optical axis, wherein the lens drive means is composed of a progressive wave type motor.

The second optical system control unit to accomplish the second object of the present invention will be described as follows:

In the same construction as that of the first optical system control unit, the lens drive means is composed of a microactuator.

The aforementioned lens supported in such a manner that it can be freely rotated around the optical axis, is constructed so that it can be freely moved in a direction of the optical axis, and the aforementioned lens drive means is provided with a function by which the lens is linearly moved in the direction of the optical axis independently from the rotation of the lens, so that the focal position can be adjusted.

When the lens is rotated by the lens drive means around the optical axis, the light amount control members such as a diaphragm member and a shutter are driven so that the light amount is controlled. Since the light amount control member is driven through the rotation of the lens, it is not necessary to provide a different drive member on the optical axis. Therefore, the camera size can be reduced.

In the case of the first example in which the lens drive means is composed of a progressive wave type motor, the lens functions as a rotor, and a stator portion is formed on the outer circumference. In this way, the size of the rotational drive means can be sufficiently reduced. The drive mechanism for linearly driving in the optical axis direction can be made to be sufficiently compact when at least a pair of oscillators are provided in the optical axis direction.

In the second example in which the lens drive means is composed of a microactuator, for example, an actuator using artificial cilia is adopted for a motion of a specific direction. In this way, while the size of the means can be sufficiently reduced, the rotational drive and linear drive of the lens can be carried out.

In the case where a lens capable of being freely rotated around the optical axis, is supported so that the lens can be linearly moved in the optical axis direction, and also in the case where the lens drive means is provided with a function by which the lens is linearly moved in the optical axis direction, the focal distance can be also controlled by the drive means. Therefore, the drive means can be used for controlling both lens movement and focal position. Accordingly, the size of the entire control mechanism can be reduced.

The optical system control unit to accomplish the third object of the present invention comprises: a pair of lens members provided so that they can be relatively rotated around the optical axis; a cavity portion formed between the opposed lens surfaces, the sectional side profile of the cavity portion being formed in such a manner that a distance between the lens surface and the cavity surface opposed to the lens is gradually reduced as it proceeds from the periphery to the center; a light shielding fluid injected into the cavity portion, the light shielding fluid reducing a light transmission area formed at the center as an injection amount of the light shielding fluid is increased; a drive means for driving one of the lens members; a pump chamber formed in the periphery of one of the lens members, the pump chamber being communicated with the cavity portion; a blade member formed in the periphery of the other lens member, the blade member sliding in the pump chamber; and a pump means for charging the light shielding fluid from the pump chamber into the cavity portion and discharging the light shielding fluid from the cavity portion.

The optical system control unit to accomplish the object of the present invention may comprises a vibrating means for vibrating the light shielding fluid in the cavity portion.

According to the construction described above, an amount of light passing through the light transmitting portion formed between the lens members is restricted in the following manner:

When one of the lens members is rotated by the drive means, the blade provided in the periphery of the lens member slides in the pump chamber, so that the light shielding fluid is discharged from the pump chamber and injected into the cavity portion. Since the cavity portion is formed between the opposed lens surfaces, the sectional side profile of the cavity portion being formed in such a manner that a distance between the lens surface and the cavity surface opposed to the lens is gradually reduced as it proceeds from the periphery to the center, a portion of the injected fluid moves from the periphery of the cavity to the center by the action of a surface tension of the fluid so that the surface area of the fluid can be minimized, that is, an approximately cylindrical light transmitting portion is formed in the center, and the peripheral portion is filled with the light shielding fluid. The light shielding portion is formed and stabilized in the above manner.

When an amount of injected light shielding fluid is increased by controlling the drive means for rotating the lens, the area of the light shielding portion is increased and the area of the light transmitting portion is decreased. Therefore, when a rotational angle of the lens member is changed, an amount of light passing through the light transmitting portion can be controlled.

As described above, when either of the lens members is rotated so that the rotational angle of the lens is controlled, an amount of injected light shielding fluid can be easily controlled. Therefore, an amount of light passing through the light transmitting portion can be controlled. Accordingly, the size and weight of the entire apparatus can be reduced, and the number of parts can be also reduced and the cost can be lowered.

In the case where a vibrating means for vibrating the light shielding fluid in the cavity is provided, the peripheral surface of the light transmitting portion formed in the cavity is waved, so that unnecessary reflected light is diffused and the occurrence of flare and ghost can be prevented.

DETAILED DESCRIPTION OF THE PREFERRED EMBODIMENT

With reference to the accompanying drawings, an example of the present invention will be explained as follows. However, it should be noted that the present invention is not limited to the specific example.

FIGS. 1 to 7 show the first example to accomplish the first object of the present invention.

Figure 1:
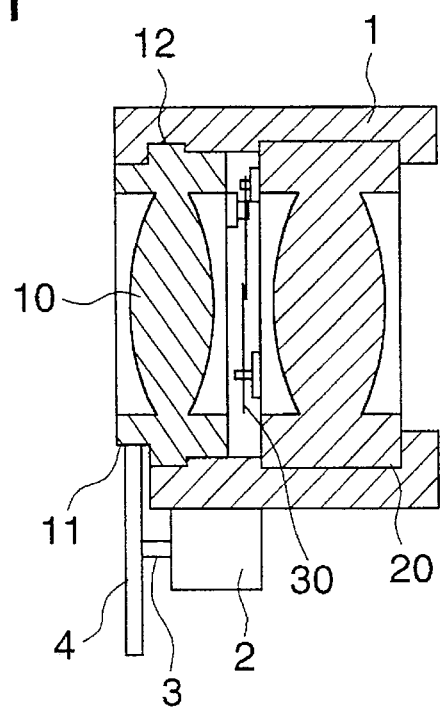
FIG. 1 is a partial sectional view of the shutter unit of the first example to accomplish the first object of the present invention.
Figure 2:
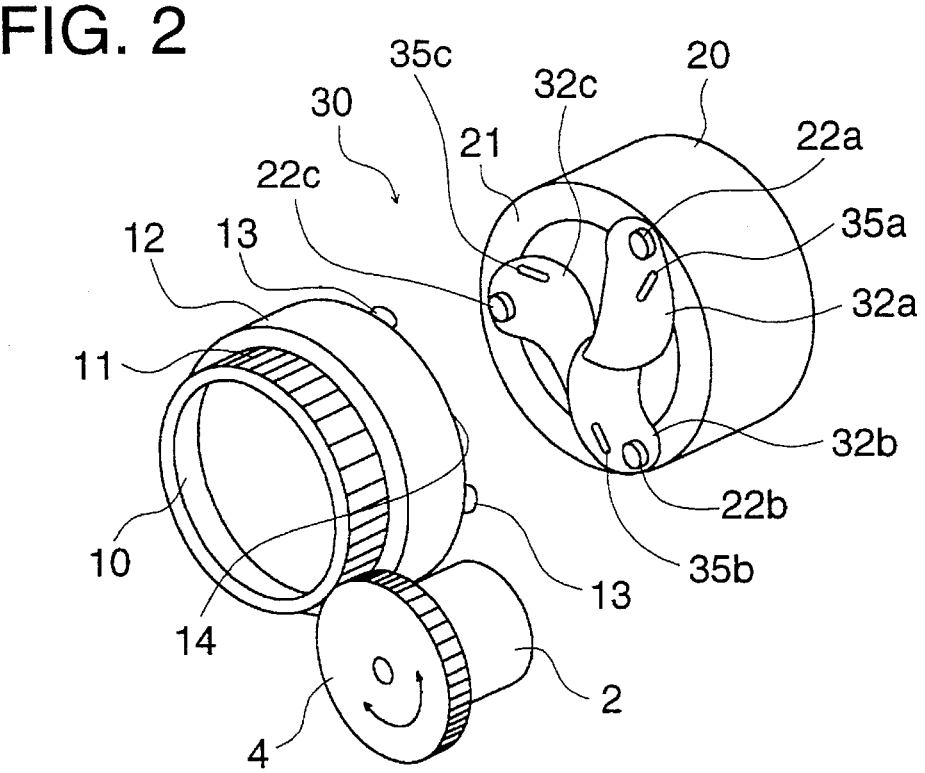
FIG. 2 is a perspective view for explaining the assembly of the shutter unit of the first example of the present invention.

As shown in FIG. 1 and 2, the shutter unit of a camera is provided with a plurality of lenses which compose a group of camera lenses. This lens group includes a rotational lens 10 disposed on the photographic object side, and a fixed lens 20 disposed on the film side. A diaphragm 30 is provided between the rotational lens 10 and fixed lens 20.

Tooth grooves 11 are formed in an outer peripheral portion on the photographic object side of the rotational lens 10, and a rotational support portion 12 is provided in the outer peripheral portion of the center of the rotational lens 10 with respect to the width direction. The rotational lens 10 is rotatably supported by a lens barrel 1 which works as a support member. A motor 2, which is a rotating means for rotating the rotational lens 10, is fixed to the outer periphery of the lens barrel 1. A drive gear 4 mounted on a motor shaft 3 is meshed with the tooth grooves 11 described before.

According to the construction of the present invention, three pins 13a, 13b, 13c, which compose a link means, are protruded from a bottom surface portion on the film side of the rotational lens 10.

Concerning the fixed lens 20, an outer periphery 21 of the fixed lens 20 is supported by the lens barrel 1.

In this example, the diaphragm 30 is composed of three diaphragm plates 32a, 32b, 32c. The diaphragm plates 32a, 32b, 32c rotate around fulcrums 22a, 22b, 22c provided on the bottom surface 21 on the photographic object side of the fixed lens 20. In this case, the diaphragm plates 32a, 32b, 32c rotate from the center of the lens aperture to the periphery. In accordance with an amount of the rotation, an aperture is formed in the center through which incident light passes. When the amounts of rotation of the three diaphragm plates 32a, 32b, 32c are controlled, the effective aperture diameter can be determined. When the time in which the three diaphragm plates 32a, 32b, 32c are rotated, the exposure time can be determined. Consequently, the diaphragm 30 composes a light amount control member.

The diaphragm plates 32a, 32b, 32c are respectively provided with engaging grooves 35a, 35b, 35c, which compose a link means. The three pins 13a, 13b, 13c engage with the engaging grooves 35a, 35b, 35c.

According to the construction described above, since the drive gear 4 meshes with the tooth grooves 11, the rotational lens 10 is rotated inside the lens barrel 1 when the motor 2 is driven. Further, since the pins 13a, 13b, 13c are engaged with the engaging grooves 35a, 35b, 35c, the diaphragm plates 32a, 32b, 32c are opened and closed in accordance with the rotation of the rotational lens 10.

In other words, when the motor 2 is rotated, a light amount is controlled by the diaphragm 30 through the rotational lens 10.

According to the first example of the present invention, the size and weight of the apparatus can be reduced in the following manner:

Concerning the diaphragm plates 32a, 32b, 32c to control a light amount, the thickness can be reduced for the purpose of reducing the weight. Further, since the diaphragm plates 32a, 32b, 32c are driven by the rotational lens 10, it is not necessary to provide a drive member for driving the diaphragm plates 32a, 32b, 32c. Therefore, it is possible to dispose the rotational lens 10 and fixed lens 20 close to each other. In this way the apparatus can be made compact.

As described above, the rotational lens 10 and fixed lens 20 can be positioned close to each other. Accordingly, the optical axis of the lens group can be aligned with high accuracy, so that the quality can be improved.

In this connection, the diaphragm plates 32a, 32b, 32c may be pushed by a spring to the center of the lens aperture, that is, the diaphragm plates 32a, 32b, 32c may be pushed in a direction so that the lens aperture can be reduced. In this case, unnecessary light can be prevented by the diaphragm plates 32a, 32b, 32c from being incident on an image sensor. Therefore, the diaphragm plates 32a, 32b, 32c also functions as a lens barrier.

Figure 3:
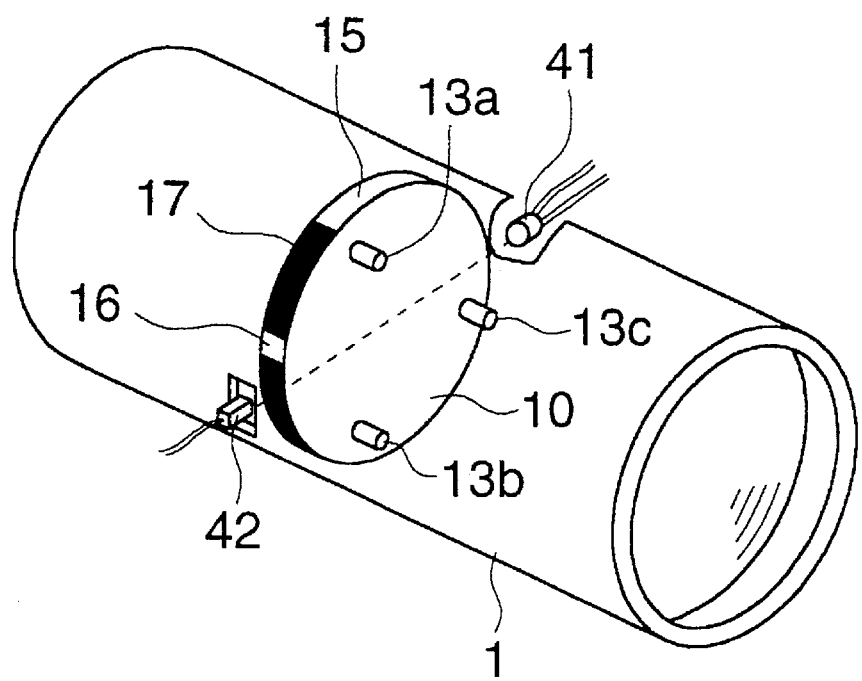
FIG. 3 is a perspective view for explaining the positional detection of the rotational lens of the first example of the present invention.

It is necessary to detect the rotational position of the rotational lens 10. In the first example of the present invention, as illustrated in FIG. 3, a transparent portion 16 and an opaque portion 17 are provided on the outer circumference of the rotational lens 10 on the film side, and a light emitting element 41 and a light receiving element 42 are provided in the openings which are formed in the lens barrel 1 being opposed to each other. Due to the foregoing, the rotational position of the lens can be optically detected. In this connection, it is preferable that the opaque portion 17 is painted black so that the reflection by the inner surface can be prevented.

It is preferable that light emission is stopped during the process of photometry because there is a possibility of leakage of light. Alternatively, it is possible to conduct positional detection using light, the intensity of which is lower than the sensitivity of the image sensor. Also, light of the light emitting diode used for range-finding and light of the light emitting element for a self-timer may be utilized.

In this connection, FIGS. 4 to 7 show the construction relating to the positional detection of rotation of the rotational lens 10.

Figure 4:
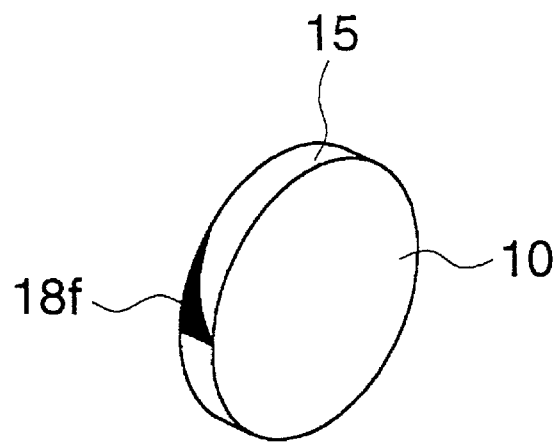
FIG. 4 is a perspective view showing another example of the rotational lens relating to the positional detection.

As illustrated in FIG. 4, when an oblique opaque portion 18f is provided in the outer circumferential portion of the rotational lens 10 on the film side, a shield ratio of the amount of light sent from the light emitting element is measured. According to the result of measurement, an absolute rotational angle of the lens can be found.

Figure 5:
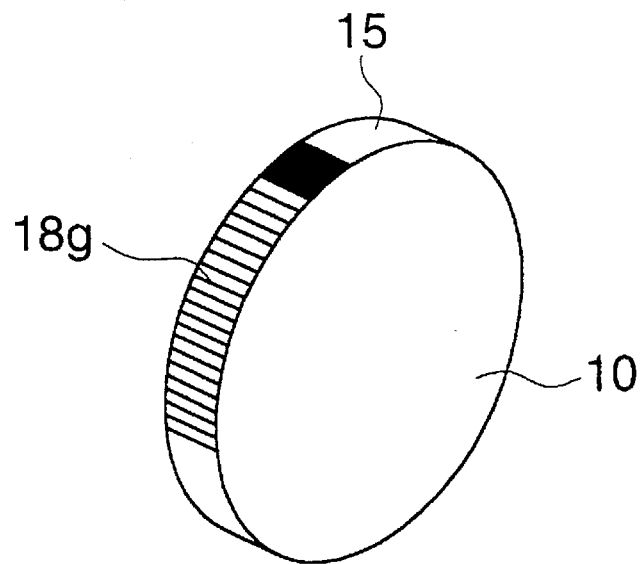
FIG. 5 is a perspective view showing another example of the rotational lens relating to the positional detection.

As illustrated in FIG. 5, when an intermittent opaque portion 18g is provided in the outer circumferential portion 15 of the rotational lens 10 on the film side, pulses can be counted when light sent from the light emitting element is shielded by the opaque portion 18g. In this way, a relative rotational angle of the lens can be found. When an absolute rotational angle is found by this means, it is necessary to previously detect the starting position.

Figure 6:
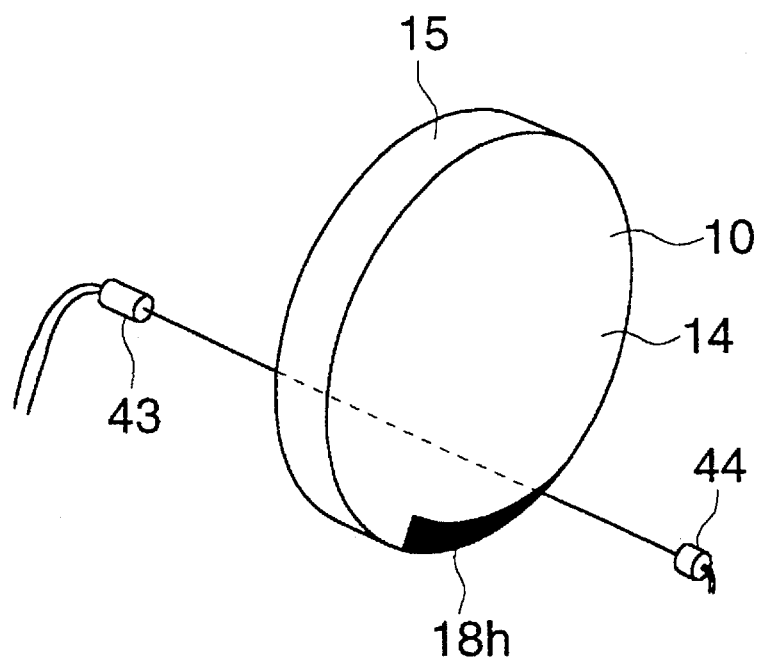
FIG. 6 is a perspective view showing another example of the rotational lens relating to the positional detection.

In the construction shown in FIG. 6, an absolute rotational angle of the lens is found in the following manner. An oblique opaque portion 18h is provided in the bottom surface portion of the rotational lens 10 on the film side, and a light emitting element 43 and light receiving element 44 are provided so that they are opposed to each other with respect to the bottom surface portion 14 of the lens on the film side. In this way, a ratio of shielded light can be measured with respect to the light emitted in the same direction as that of the lens aperture. Usually, the image sensor is rectangular and included in an image circle. Therefore, the light emitting element 43 and light receiving element 44 can be disposed in such a manner that the image sensor is not coincident with these elements. In this way, the above construction can be realized.

Figure 7:
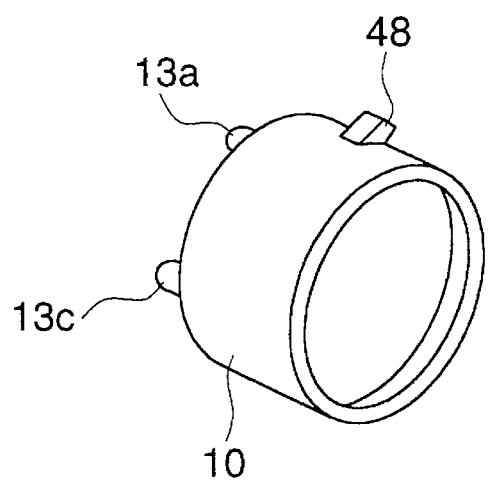
FIG. 7 is a perspective view showing another example of the rotational lens relating to the positional detection.

In the construction illustrated in FIG. 7, a rotational angle of the lens is found in the following manner. A protrusion 48 is provided in the outer circumferential portion 15 of the rotational lens 10 on the film side, and a rotational motion of the protrusion 48 is detected by a photo-interrupter so that the rotational angle can be found.

Next, with reference to FIG. 8, the second example of the present invention will be explained as follows. Like parts in each the first and second examples are identified by the same reference character, and the explanation will be omitted here.

Figure 8:
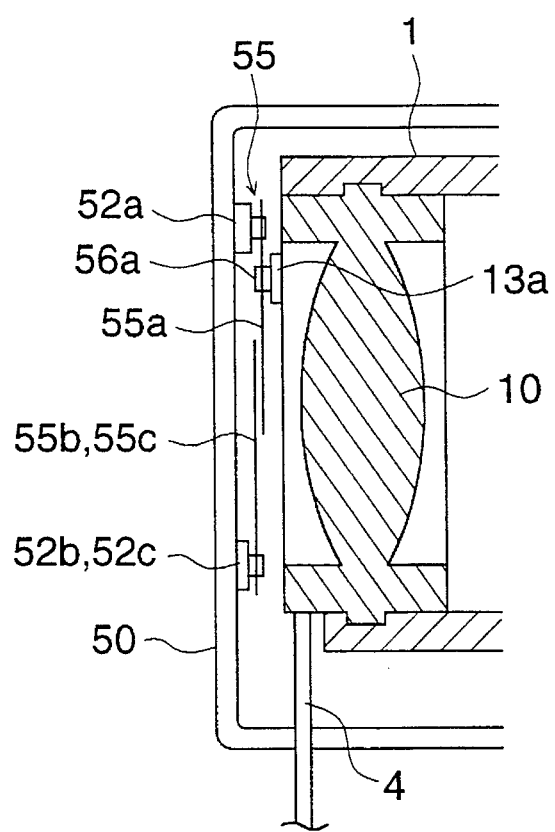
FIG. 8 is a partial sectional view of the shutter unit of the second example to accomplish the first object of the present invention.
Figure 9:
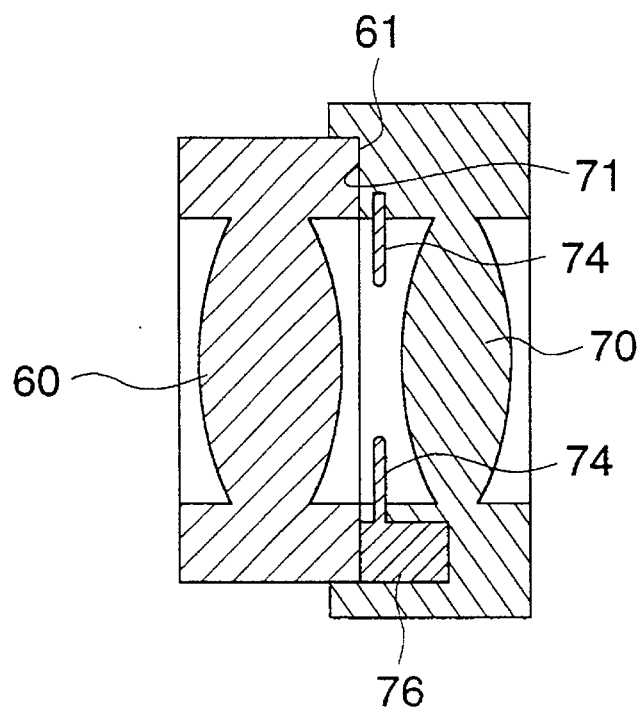
FIG. 9 is a partial sectional view of the shutter unit of the third example to accomplish the first object of the present invention.
Figure 10:
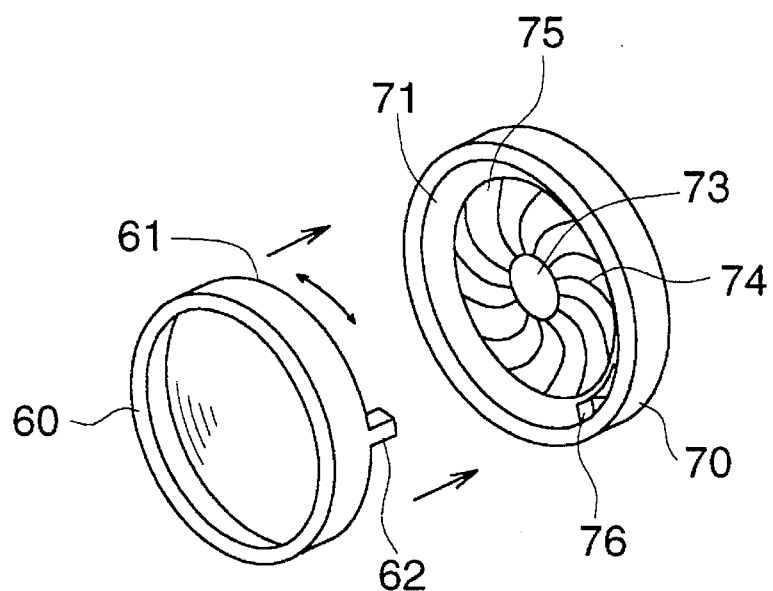
FIG. 10 is a perspective view for explaining the assembly of the unit of the third example of the present invention.
Figure 11:
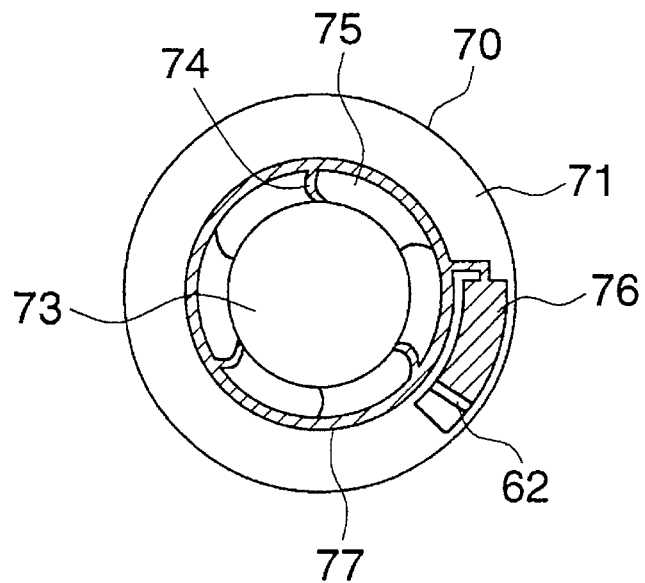
FIG. 11 is a front view for explaining the operation of the unit relating to the third example.
Figure 12:
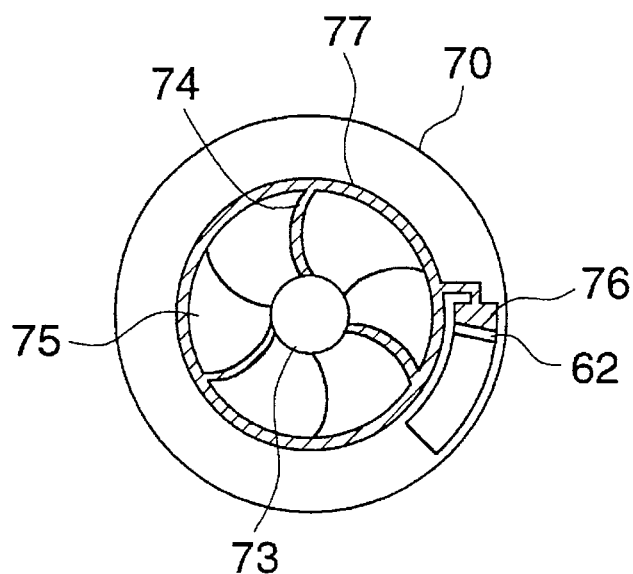
FIG. 12 is a front view for explaining the assembly of the unit relating to the third example of the present invention.

As illustrated in FIG. 8, in the second example of the present invention, an outer circumferential portion of the lens barrel 1 and a surface portion on the photographic object side are covered with a transparent cover 50, and a diaphragm 55 is provided between the cover 50 and rotational lens 10. In this example, the diaphragm 55 is composed of three diaphragm plates 55a, 55b, 55c. The diaphragm plates 55a, 55b, 55c rotate around fulcrums 52a, 52b, 52c provided on the surface 51 of the cover 50 on the photographic object side. In this case, the diaphragm plates 55a, 55b, 55c rotate from the center of the lens aperture to the periphery. In accordance with an amount of the rotation, an aperture is formed in the center through which incident light passes. When the amounts of rotation of the three diaphragm plates 55a, 55b, 55c are controlled, the effective aperture diameter can be determined. When the time in which the three diaphragm plates 55a, 55b, 55c are rotated, the exposure time can be determined. Consequently, the diaphragm 55 composes a light amount control member.

The diaphragm plates 55a, 55b, 55c are respectively provided with engaging grooves 56a, 56b, 56c, which compose a link means. The three pins 13a, 13b, 13c engage with the engaging grooves 56a, 56b, 56c.

According to the above construction, the rotational lens 10 rotates in the inner circumferential portion of the lense barrel 1, and further the pins 13a, 13b, 13c are engaged with the engaging grooves 56a, 56b, 56c. Accordingly, when the rotational lens 10 is rotated, the diaphragm plates 55a, 55b, 55c are opened and closed.

When the motor 2 is rotated, an amount of light is controlled by the diaphragm 55 through the rotational lens 10.

That is, the same effect as that of the first example can be provided by the second example.

Instead of the transparent cover 50, an infrared ray filter or phase difference filter may be provided in the front portion. In this case, the same effect can be provided.

With reference to FIGS. 9 to 12, the third example to accomplish the first object of the present invention will be explained as follows. Like parts in each the first and third examples are identified by the same reference character, and the explanation will be omitted here.

Also, in the third example, tooth grooves are formed in an outer peripheral portion on the photographic object side of the rotational lens 60 (not shown in the drawing), and a rotational support portion is provided in the outer peripheral portion of the center of the rotational lens 60 with respect to the width direction. The rotational lens 60 is rotatably supported by a lens barrel 1 (not shown) which works as a support member. A motor 2, which is a rotating means for rotating the rotational lens 60, is fixed to the outer periphery of the lens barrel 1 (not shown).

In the construction of the third example, a piece of pump member 62 composing a link means is protruded from a bottom surface portion 61 of the rotational lens 60 on the film side. The bottom surface portion 61 of the rotational lens 60 on the film side is inserted into an end portion of the fixed lens 70.

On the other hand, the outer circumferential portion of a fixed lens 70 is supported by the lens barrel 1, and the fixed lens 70 is provided with an engaging portion 71 opposed to the bottom surface portion 61 of the rotational lens 60 on the film side. The engaging portion 71 is provided with a fluid reservoir 76 in which the pump member 62 can be moved. On the inner circumference of the engaging portion 71, a rubber-like film 75 formed into a diaphragm-shape is provided, which has an aperture 73 at the center and an operating element 74 to be operated by fluid. In this case, when actuating fluid flows inside the operating element 74, the operating element 74 linearly expands so that the aperture 73 can be reduced (shown in FIG. 12). The operating element 74 is communicated with the fluid reservoir 76 through a communicating annular passage 77.

Electro-rheological fluid may be used for this operating element 74. This electro-rheological fluid is fluid in a normal condition. However, when a voltage is impressed upon the electro-rheological fluid, particles in the fluid are instantaneously connected like chains so that the fluid is solidified. This principle is utilized in the present invention.

According to the construction described above, the pump member 62 is engaged with the fluid reservoir 76 and moved in accordance with the rotation of the rotational lens 60. Therefore, when the motor 2 is rotated, the rotational lens 60 is rotated inside the lense barrel 1, and the pump member 62 is moved in the fluid reservoir 76. Consequently, the actuating fluid in the fluid reservoir 76 is supplied to the operating element 74 through the communicating annular passage 77. Accordingly, the operating element 74 is linearly expanded, and the rubber-like film 75 is extended, so that the aperture 73 is reduced. When the motor 2 is reversed, the actuating fluid in the operating element 74 is discharged into the fluid reservoir 76 through the communicating annular passage 77. Therefore, the operating element 74 is contracted, and the rubber-like film 75 is also contracted, so that the aperture 73 is extended.

As described above, in the third example, the operating element 74 and rubber-like film 75 compose light amount control members, and when an amount of movement of the pump member 62 is controlled, the effective aperture diameter can be determined, and when a period of time required for movement is controlled, the exposure time can be determined.

In other words, when the motor 2 is driven, an amount of light is controlled by the operating element 74 and rubber-like film 75 through the rotational lens 60.

That is, in the third example, the same action and effect can be provided as that of the first example.

In the example described above, the rotational lenses 10, 60 are rotated by the motor 2 which is a rotational means. However, with reference to FIGS. 13 to 16, an example will be explained, in which the rotational lenses 10, 60 are rotated by a rotational means except for a motor. In FIG. 13 to 16, only the rotational lens is illustrated for simplification, and other components are omitted.

Figure 13:
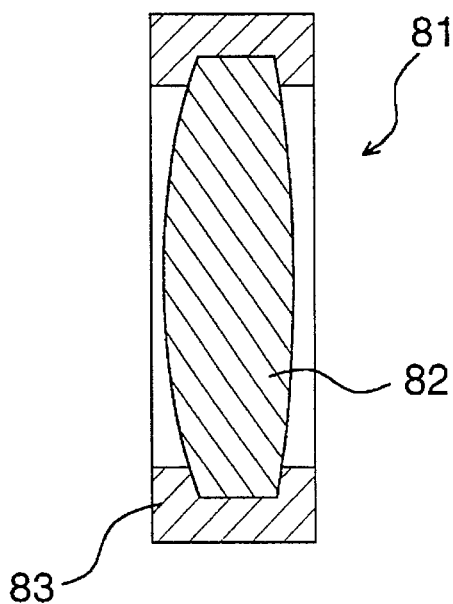
FIG. 13 is a sectional view showing another example relating to the rotational lens.

A rotational lens 81 shown in FIG. 13 is made in the following manner. A lens 82 is made of glass, and magnetic powder 83 is sintered into a body so as to be integrated with the lens 82. The integrated body is magnetized so as to be formed into a rotor. In this connection, the magnetic powder 83 may be injected with pressure around the glass lens 82. It is preferable that the aforementioned pins 13a, 13b, 13c are formed on the magnetic powder 83, because a torque for driving the diaphragm is not directly impressed upon the glass lens 82 so that the occurrence of distortion of the glass lens 82 can be prevented.

Figure 14:
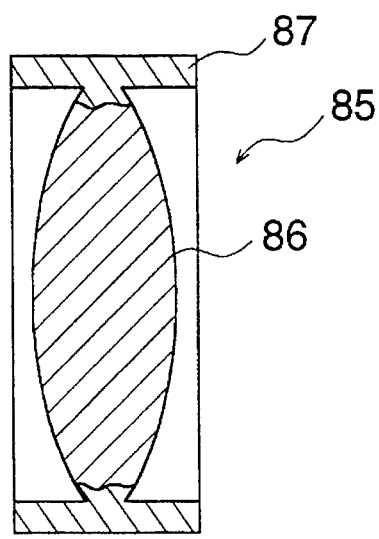
FIG. 14 is a sectional view showing another example relating to the rotational lens.

A rotational lens 85 shown in FIG. 14 is made by means of two-color-forming of resin, so that the optical portion of the lens 85 is formed of transparent resin 86, and the periphery of the lens 85 is formed of resin 87 containing magnetic powder. Then the periphery is magnetized so that it is formed into a rotor.

Figure 15:
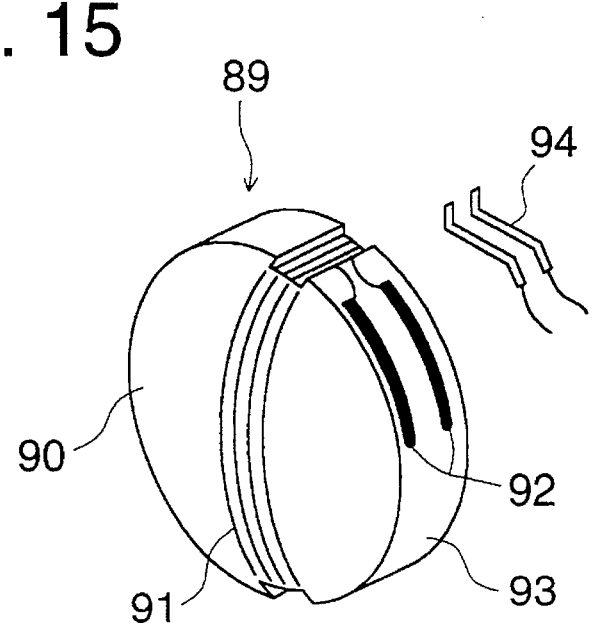
FIG. 15 is a sectional view showing another example relating to the rotational lens.

Concerning the rotational lens 89 shown in FIG. 15, a coil 91 is formed on the lens surface 90 with a transparent pattern used for liquid crystal wiring. Further, an electrode pattern 92 for supplying electricity to the coil 91 is formed in the outer periphery 93, so that electricity can be supplied to the coil 91 through a brush 94.

Figure 16:
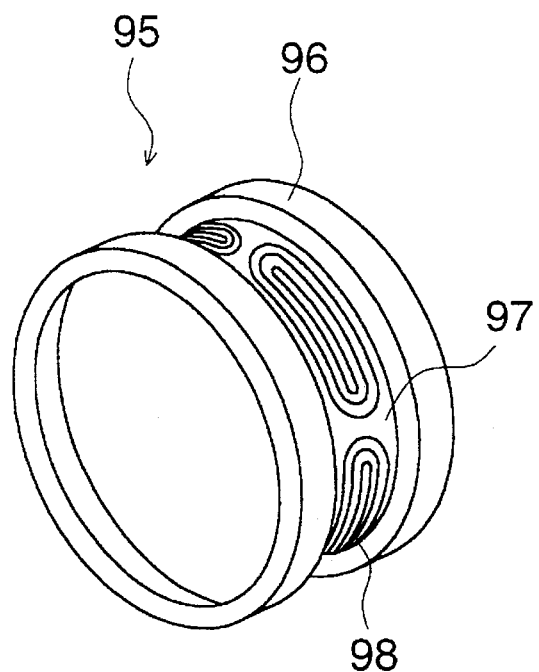
FIG. 16 is a sectional view showing another example relating to the rotational lens.

A rotational lens 95 shown in FIG. 16 is integrated with a lens barrel 96, and a coil pattern 98 is adhered onto the outer circumference 97 of the lens barrel 96.

According to the construction of the example, the rotational lens is rotated in the lens barrel, so that lubrication is required for the rotation. In view of optical effect, it is preferable that solid lubricant or self-lubricant is used. Even when the lubricant oozes out into the optical system, it is possible to detect the lubricant so as to take measures in the processing of a signal of the image sensor.

Figure 17:
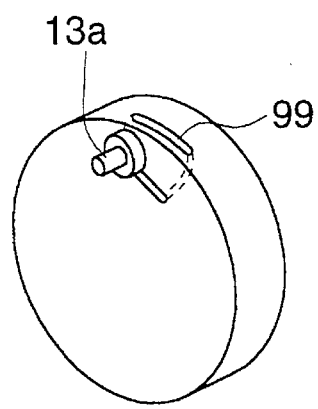
FIG. 17 is a sectional view showing another example relating to the rotational lens.
Figure 18:
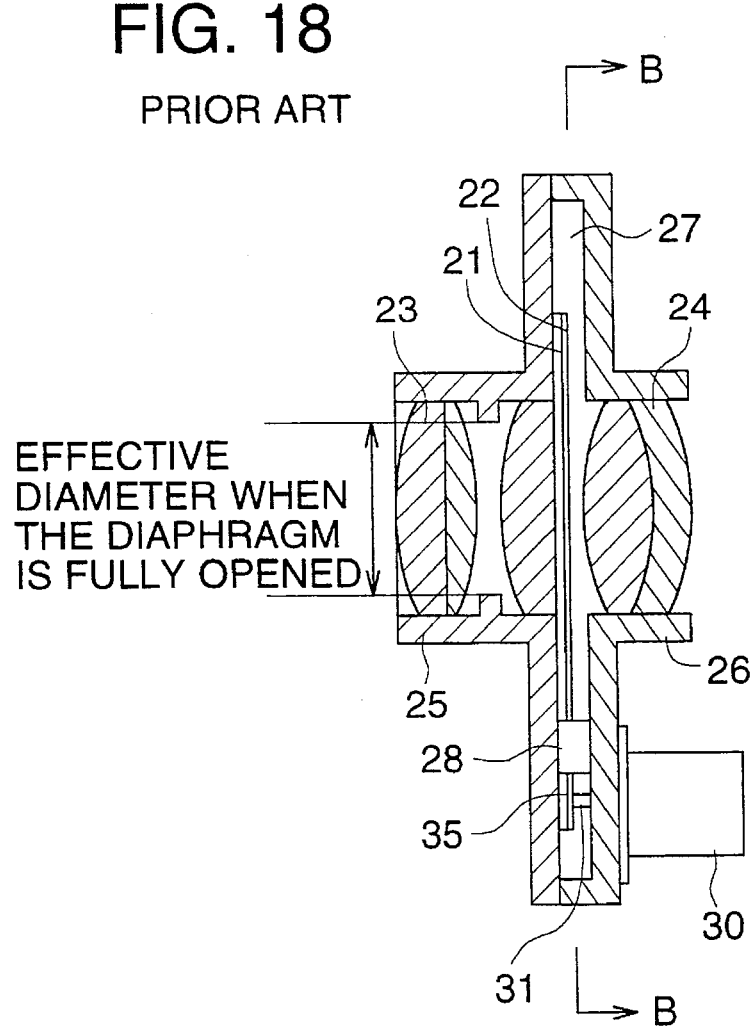
FIG. 18 is a partial sectional view of the conventional shutter unit.
Figure 19:
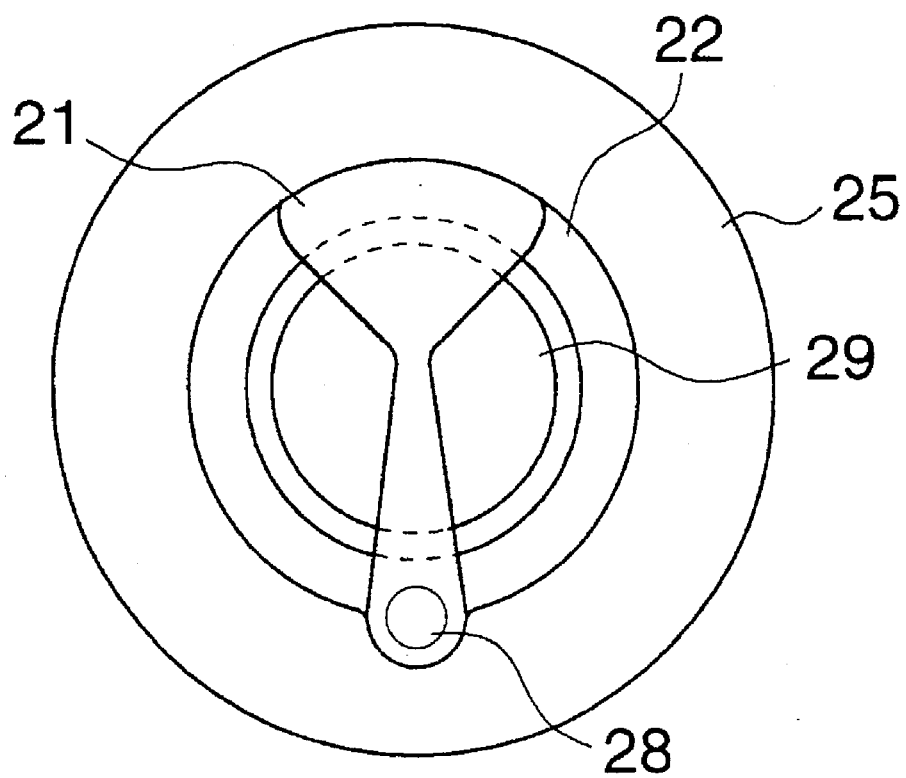
FIG. 19 is a transverse sectional view taken on line B—B in FIG. 18.

A gap 99 may be formed between the pin 13a and the lens portion as illustrated in FIG. 17. Due to the foregoing, it is possible to prevent the occurrence of residual stress caused when the pin 13a is formed by means of injection molding, and it is also possible to prevent the occurrence of distortion of the lens portion caused when the lens portion is driven. Instead of the gap 99, a rib may be provided.

As explained above, the light amount control unit of the present invention includes a rotating means for rotating a predetermined lens, and a link means for linking the rotation of the lens with the opening and closing motion of the light amount control unit. Therefore, the light amount control member is driven through the predetermined lens, and it is not necessary to provide a drive mechanism such as sliding and engaging members to the light amount control unit. Consequently, the light amount control unit can be made compact, and the installation space can be reduced.

With reference to the accompanying drawings, an example to accomplish the second object of the present invention will be explained as follows.

Figure 20:
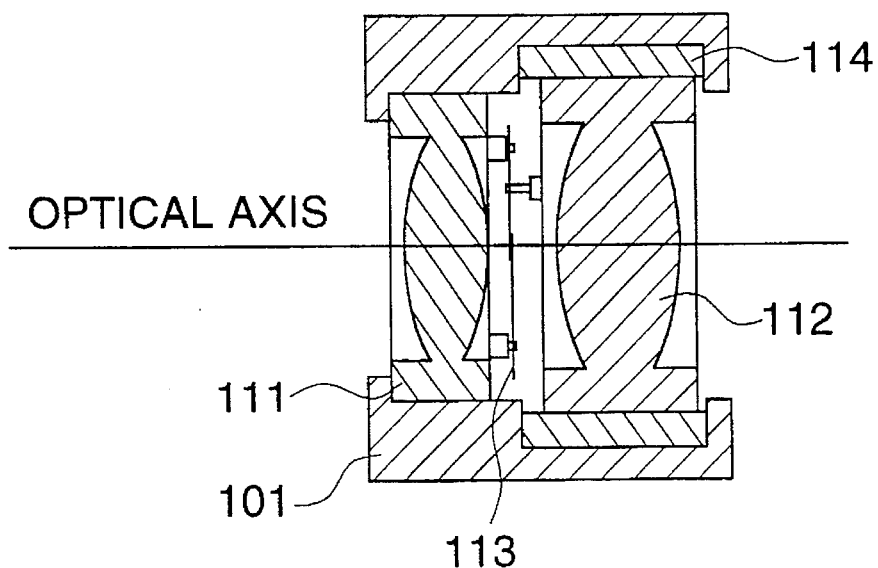
FIG. 20 is a sectional view showing the first essential construction to accomplish the second object of the present invention.
Figure 21:
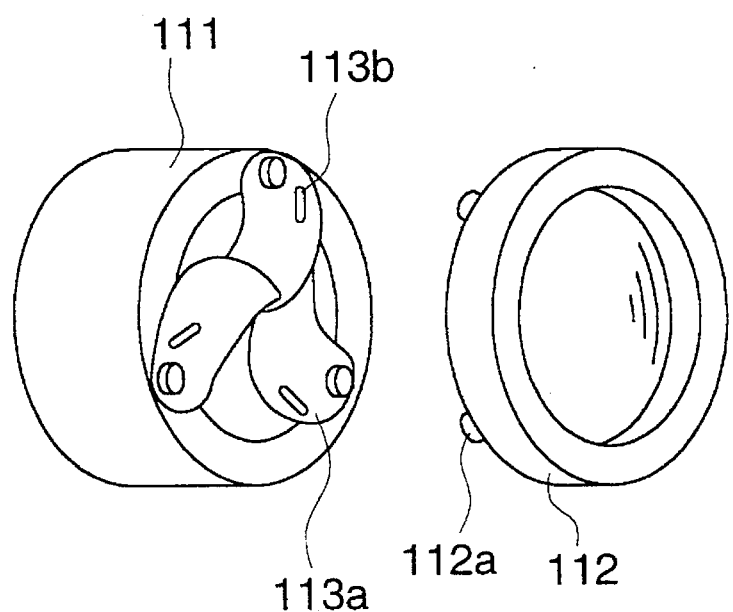
FIG. 21 is a perspective view showing the above essential construction.

FIG. 20 is a view showing a basic construction of the present invention (the first invention). A fixed lens 111 and movable lens 112 are inserted into a lens barrel 101. A diaphragm member 113 is provided between the fixed lens 111 and the movable lens 112. The movable lens 112 is rotated around the optical axis in the lens barrel 101 by a progressive wave type motor 114 disposed outside the lens, and further the movable lens 112 is capable of being linearly moved in the optical axis direction. As illustrated in FIG. 21, a diaphragm unit 113 is composed of diaphragm blades 113a, the end portions of which are pivotally attached to the periphery of the fixed lens 111. Each blade 113a is provided with a long hole 113b, and a pin 112a fixed to the periphery of the movable lens 112 is engaged with this long hole 113b.

When the movable lens 112 is rotated around the optical axis, each blade 113a is rotated, so that a light amount can be controlled. In this connection, the pin 112a and long hole 113b compose a link means for linking the diaphragm member with the lens.

Figure 22:
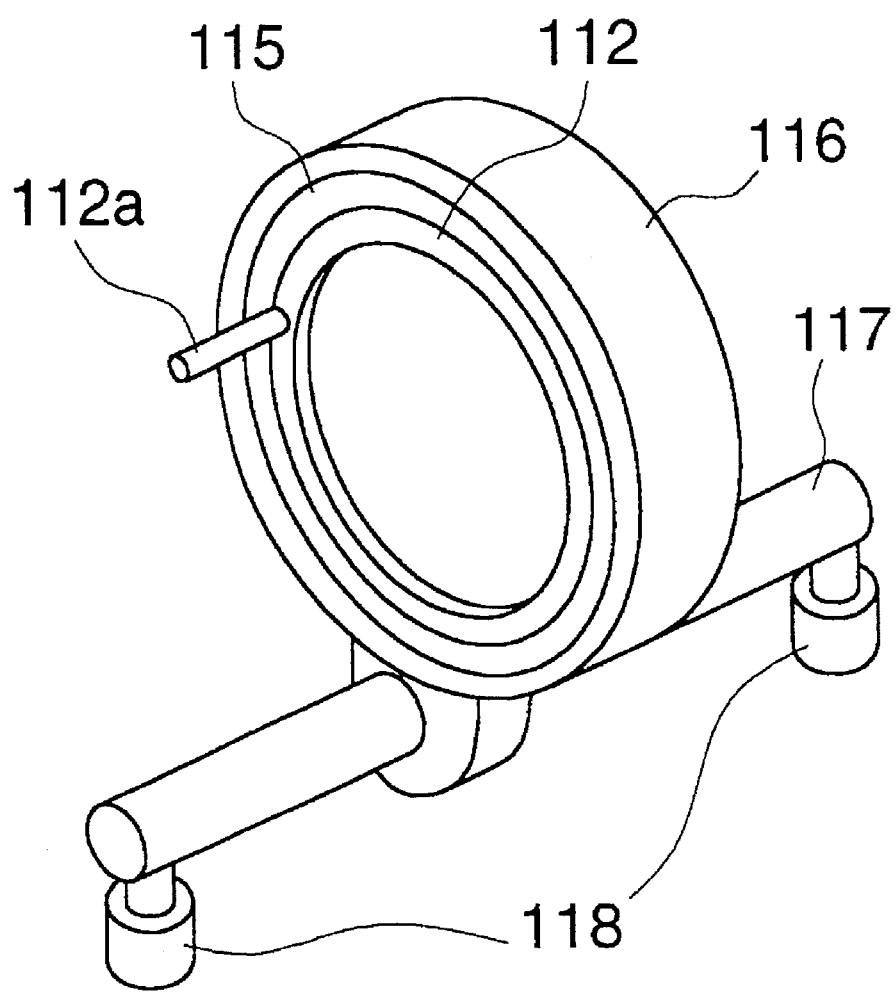
FIG. 22 is a perspective view showing the first example of the lens drive means.

FIG. 22 is a perspective view showing the first specific example in which the movable lens 112 is rotated around the optical axis by the progressive wave type motor 114 and linearly moved in the direction of the optical axis.

In this case, the movable lens 112 functions as a rotor of the progressive wave type motor for rotating the lens. Therefore, a ring-shaped stator 115 of the progressive wave type motor is inserted to the outer circumference of the rotor. The stator 115 is inserted to the lens holder 116 so as to be held. A portion of the lens holder 116 is protruded from outside, and the protruding portion is inserted to a rod 117 disposed in parallel with the optical axis, so that the lens holder 116 can be freely moved in the axial direction. In this connection, the pin 112a is fixed to the movable lens 112 as described above. As shown in FIG. 1, the pin 112a is engaged with the blade 113a of the diaphragm member 113 attached to the fixed lens 11 side. Therefore, when the movable lens 112 is rotated, the diaphragm can be controlled. Langevin type oscillators composing the progressive wave type motor used for linear advancement are provided at both end portions of the rod 117. Grooves formed at short intervals in parallel with the axial direction are provided on the inner circumferential surface of the stator 115, the inner circumferential surface coming into contact with the movable lens 112. Circumferential grooves are formed in the axial direction at short intervals on the outer circumferential surface of the rod 117.

The mode of operation of this example will be explained as follows.

First, the principle of the progressive wave type motor (referred to as an ultrasonic motor) will be briefly explained below. Two oscillating elements are mounted on a resilient body (a metallic body). When the two oscillating elements are oscillated under the condition that the phases of the oscillated waves are different, one oscillating element functions as an oscillator, and the other oscillating element functions as an absorber. Therefore, progressive waves advancing in one direction are transmitted to the resilient body. Then, the resilient body is deformed by the action of the progressive waves, and the mass point on the surface makes an elliptic motion. Then, an object is made to come into contact with the surface which is making an elliptic motion. Then a portion of the resilient body surface coming into contact with the object makes a motion in a direction opposite to the direction of the progressive waves. Therefore, the contact portion of the object is given a force, the direction of which is opposite to the direction of the progressive waves. Accordingly, the object is moved in a direction opposite to that of the progressive wave. When the resilient body and the object coming into contact with it are formed annular, a rotary type motor is provided, and when they are formed linear, a linear type motor is provided.

Diaphragm control can be carried out in the following manner. Two oscillating elements attached to the stator 15 are energized with current through lead wires not shown, so that the two oscillating elements conduct oscillation in which the phases of oscillation waves are different. In this way, progressive waves advancing in the circumferential direction are transmitted to the stator 115. Then, deformation is caused on the surface of the stator 115. Due to the deformation on the surface of the stator 115, the movable lens 112 is rotated in a direction opposite to that of the progressive waves. Therefore, the diaphragm member 113 linked with the movable lense 112 through the pin 112a is moved so that a light amount can be controlled by the diaphragm.

Figure 23:
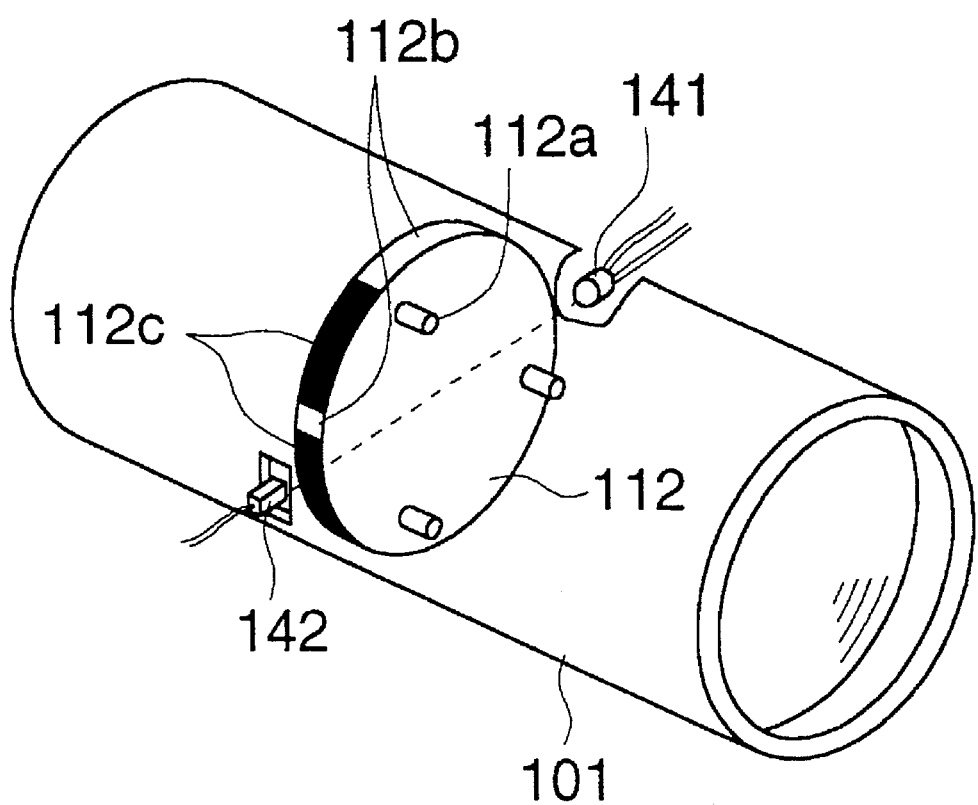
FIG. 23 is a perspective view showing an example of the rotational position detection mechanism of the movable lens of the above example.

In the above operation, it is necessary to detect the present rotational position of the movable lens 112. For example, the positional detection can be conducted as shown in FIG. 23. In FIG. 23, a transparent portion 112b and opaque portion 112c are provided on the outer circumference of the movable lens 112, and a light emitting element 141 and light receiving element 142 are provided in opening portions formed in the lens barrel 101, wherein the opening portions are opposed to each other. Due to the foregoing construction, the rotational position of the movable lens 112 can be detected. In this connection, in order to prevent the reflection on the inner surface, the opaque portion 112c is preferably pained black.

Concerning the emission of light conducted by the light emitting element 141, it is preferable that the emission is prohibited during photometry, because there is a possibility of leakage of light. Alternatively, the positional detection may be performed using a beam of light, the intensity of which is out of the range of sensitivity of the image sensor. Alternatively, a beam of light of the light emitting diode used for range-finding, or a beam of light of the light emitting element used for a self-timer may be used.

When the two Langevin type oscillating elements 118 are energized with current, so that oscillation is conducted by the two oscillating elements, the phases of oscillated waves are different to each other, and the progressive waves are transmitted to the rod 117. Then, deformation is caused on the surface of the rod 117 by the progressive waves. Therefore, the lens holder 116 moves in a direction opposite to that of the progressive waves. Due to the foregoing, a distance between the movable lens 112 and the fixed lens 111 is controlled, that is, focus control can be automatically made.

According to the above construction, the movable lens 112 functions as a drive member for driving the diaphragm member 113. Therefore, only a very thin diaphragm member 113 can be provided in the lens barrel 101, and a specific member for driving such as a lever is not required. As a result, the camera can be made compact, and the number of parts can be reduced. Further, the movable lens can be also moved in the axial direction for automatic focus control.

As described above, since the progressive wave type motor is employed for the lens drive means, the camera size can be reduced.

Figure 24:
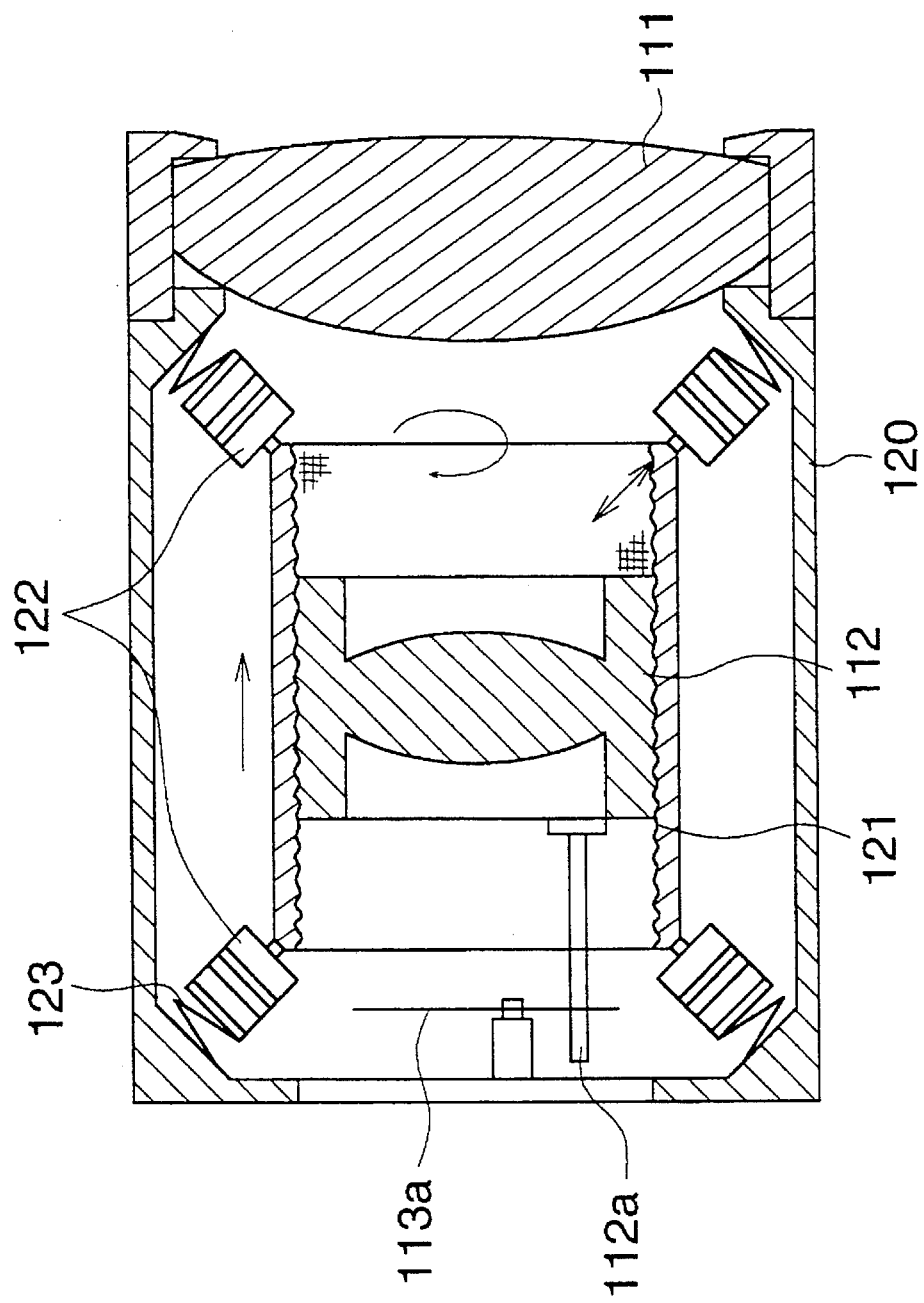
FIG. 24 is a perspective view showing the second example of the lens drive means in which a progressive wave type motor is used.
Figure 25:
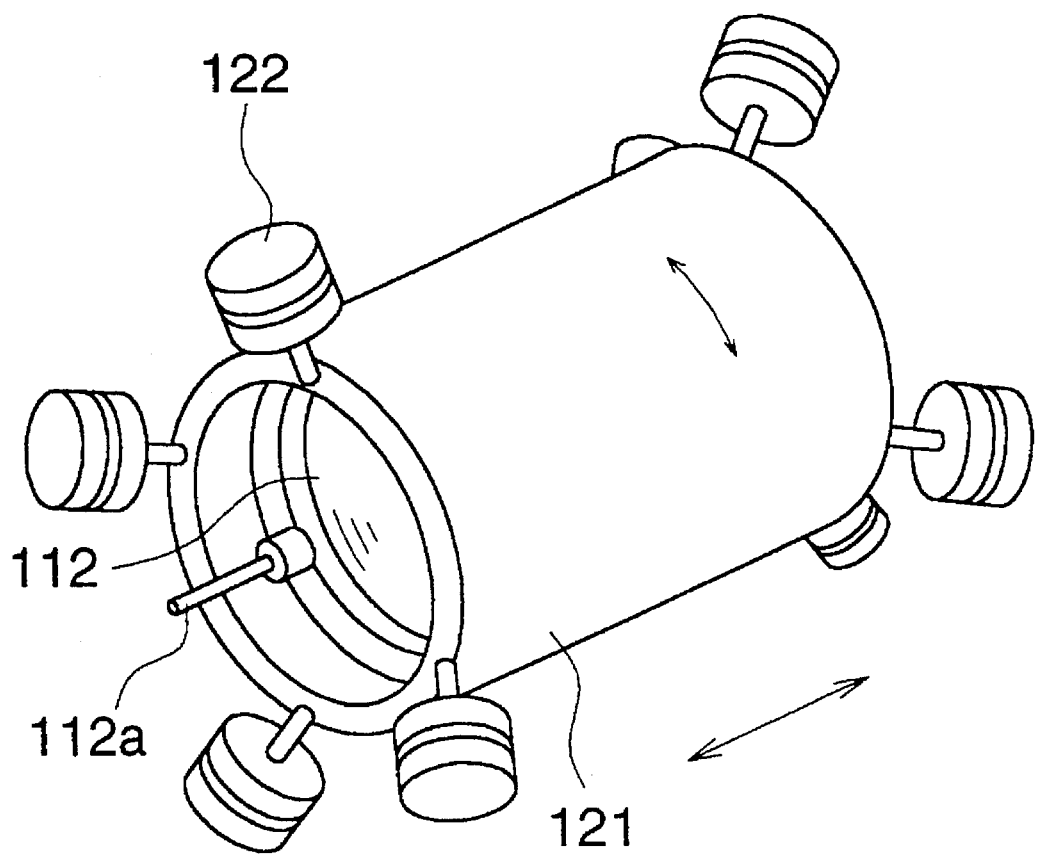
FIG. 25 is a perspective view of the primary portion of the above example.

FIGS. 24 and 25 show the second example to which the progressive wave type motor is applied.

As illustrated in the drawings, a cylindrical case 120 is fixed at the fore end of the fixed lens 111. In the cylindrical case 120, a stator 121 into which the movable lens 112 is inserted is supported through a plurality of Langevin type oscillating elements 122. As illustrated in FIG. 6, eight pieces of Langevin type oscillating elements 122 are provided in the cylindrical case 120 through springs 123. A circumferential end surface of the stator 121 is inclined by an angle of 45° with respect to the axial direction, and the Langevin type oscillating elements 122 are attached onto the inclined surfaces in such a manner that the oscillating elements 122 make a right angle with the surfaces, and four oscillating elements are provided on each side of the stator 121, so that eight oscillating elements are provided in total. On the inner circumferential surface of the stator 121, mesh-shaped grooves are formed in the circumferential and axial directions, so that the stator 121 can be easily bent in the radial and axial directions, so that the movement of the movable lens 112 is facilitated by vibration.

A pin 112a is fixed to the periphery of the front end surface of the movable lens 112 which functions as a rotor. This pin 112a is engaged with a long hole formed on the blade 113a of the diaphragm member 113 supported on the inner circumferential surface of the front end wall of the cylindrical case 120. When the movable lens 112 is rotated around the optical axis, the diaphragm member 113 is driven, so that a light amount is controlled in the same manner as that of the example described before.

When each Langevin type oscillating element 122 is oscillated, oscillation is caused in a direction forming an angle of 45° with respect to the optical axis as shown by an arrow in the drawing. The oscillation is decomposed into the first oscillation parallel with the optical axis, and the second oscillation perpendicular to the optical axis.

In this case, the oscillating elements 122 are oscillated in the following manner:

The phases of the oscillating elements 122 aligned in the direction of the optical axis are made to coincide with each other, and the phases of the oscillating elements 122 disposed on the same circumference are made to be different. Then, the first oscillation is transmitted to the stator 122 in such a manner that the first oscillation becomes a progressive wave which advances in one of the circumferential directions of the stator 121. As a result, the movable lens 112 is rotated around the optical axis, so that the diaphragm member 113 is rotated through the pin 112a. In this way, a light amount can be controlled.

On the other hand, when the oscillating elements 122 separate from each other in the optical axis direction are oscillated under the condition that the phases are different, the second oscillation is transmitted to the stator 121 in such a manner that the second oscillation becomes a progressive wave which advances in one of the axial directions of the stator 121. As a result, the movable lens 112 linearly advances to the optical direction, so that the focus can be automatically controlled.

According to the above construction, each Langevin type oscillating element 122 functions as a progressive wave type motor of the rotational direction and also as a progressive wave type motor of the axial direction. Therefore, this example exhibits the same characteristics as those of the first example described before, and further it is not necessary to supply electricity to the motor used for rotation.

In this example, eight Langevin type oscillating elements 122 are used, however, in order to obtain a drive force of the rotational direction and that of the optical axis direction, two oscillating elements may be disposed on one of the end walls under the condition that they are separated in the circumferential direction, and with respect to one of them, one oscillating element may be disposed on the end wall on the opposite side in such a manner that the oscillating element is separated from others in the longitudinal direction. Only when stability is required, other support portions may be resiliently supported.

Figure 26:
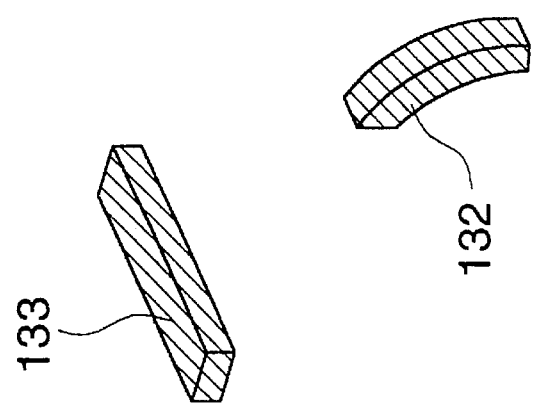
FIGS. 26a–26b is a perspective view showing the third example of the lens drive means in which a progressive wave type motor is used.
Figure 26:
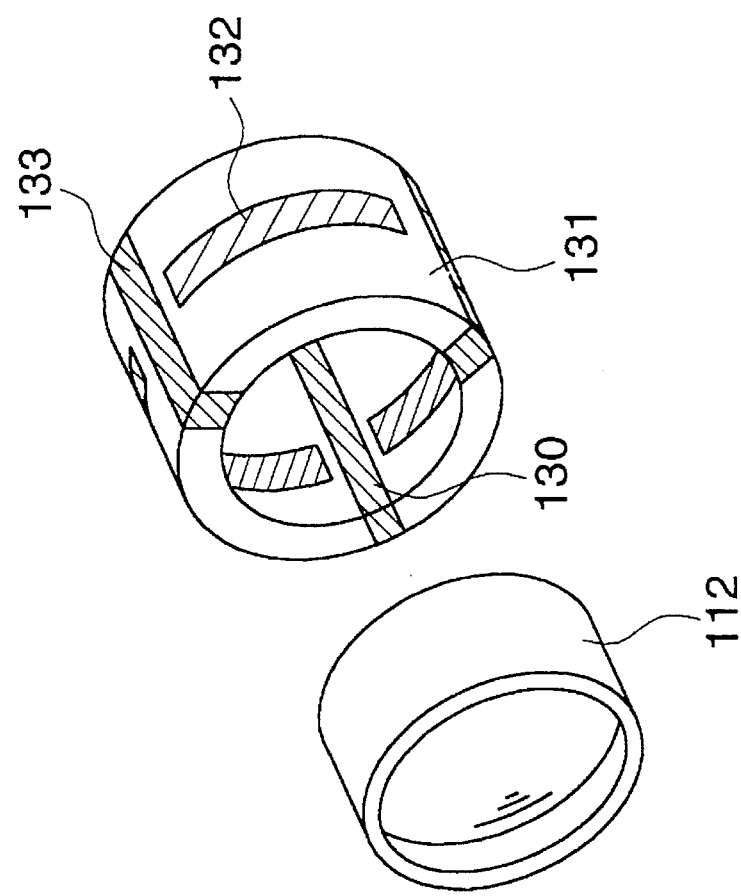

FIG. 26 is an exploded perspective view showing the primary portion of the third example to which the progressive wave type motor is applied.

In the drawing, the movable lens 112 is inserted into the cylindrical lens holder 131. Three arcuate stators 132 used for rotation are embedded in the cylindrical lens holder 131 at regular intervals in the circumferential direction. Stators 133 used for linear advancement are embedded between the adjacent stators 132, wherein the stators 133 used for linear advancement extend in the optical axial direction. The stator 132 used for rotation and the stator 133 used for linear advancement are respectively provided with oscillating elements at both ends. When these oscillators are oscillated at different phases, the movable lens 112 is rotated around the optical axis, so that a light amount can be controlled, and the lens can be linearly moved in the optical axis direction for automatic focus control.

According to the construction described above, the progressive wave type motor having two functions can be assembled into common parts. Therefore, the apparatus can be made compact as possible.

Next, an example will be explained as follows, in which the movable lens is rotated around the optical axis and linearly moved in the optical axis, so that a light amount can be controlled and focus control can be automatically conducted. In this case, a construction in which the diaphragm member is linked with the rotation of the movable lens so that the diaphragm can be controlled, is the same as that of each example described before. Therefore, the explanation will be omitted here.

Figure 27:
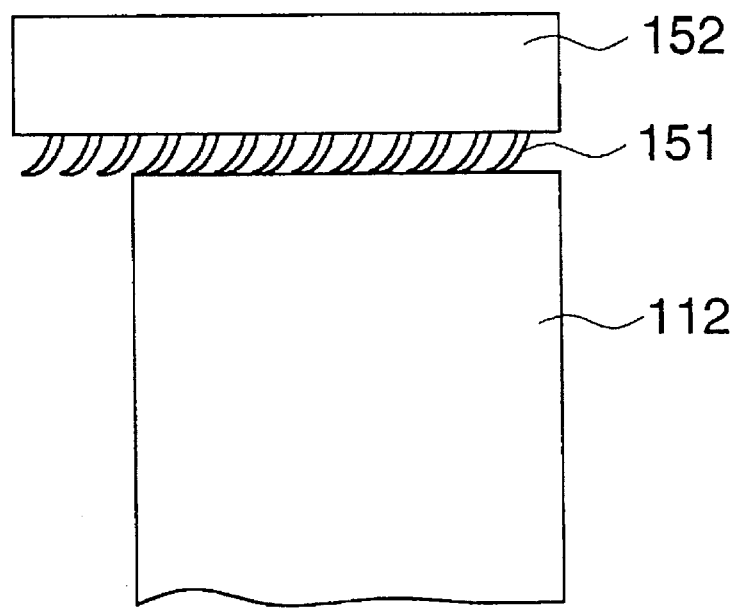
FIG. 27 is a sectional view showing an example of the lens drive means in which a microactuator is used, wherein this example is the second construction to accomplish the second object of the present invention.
Figure 28:
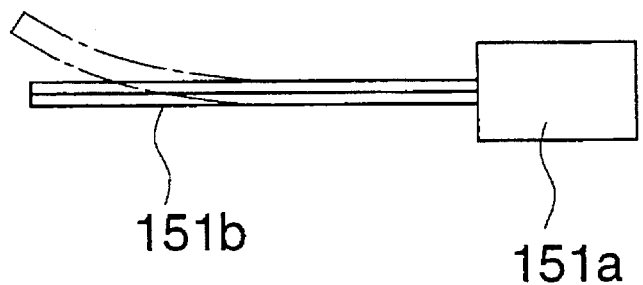
FIG. 28 is a view showing the construction of an artificial cilia type actuator.
Figure 29:
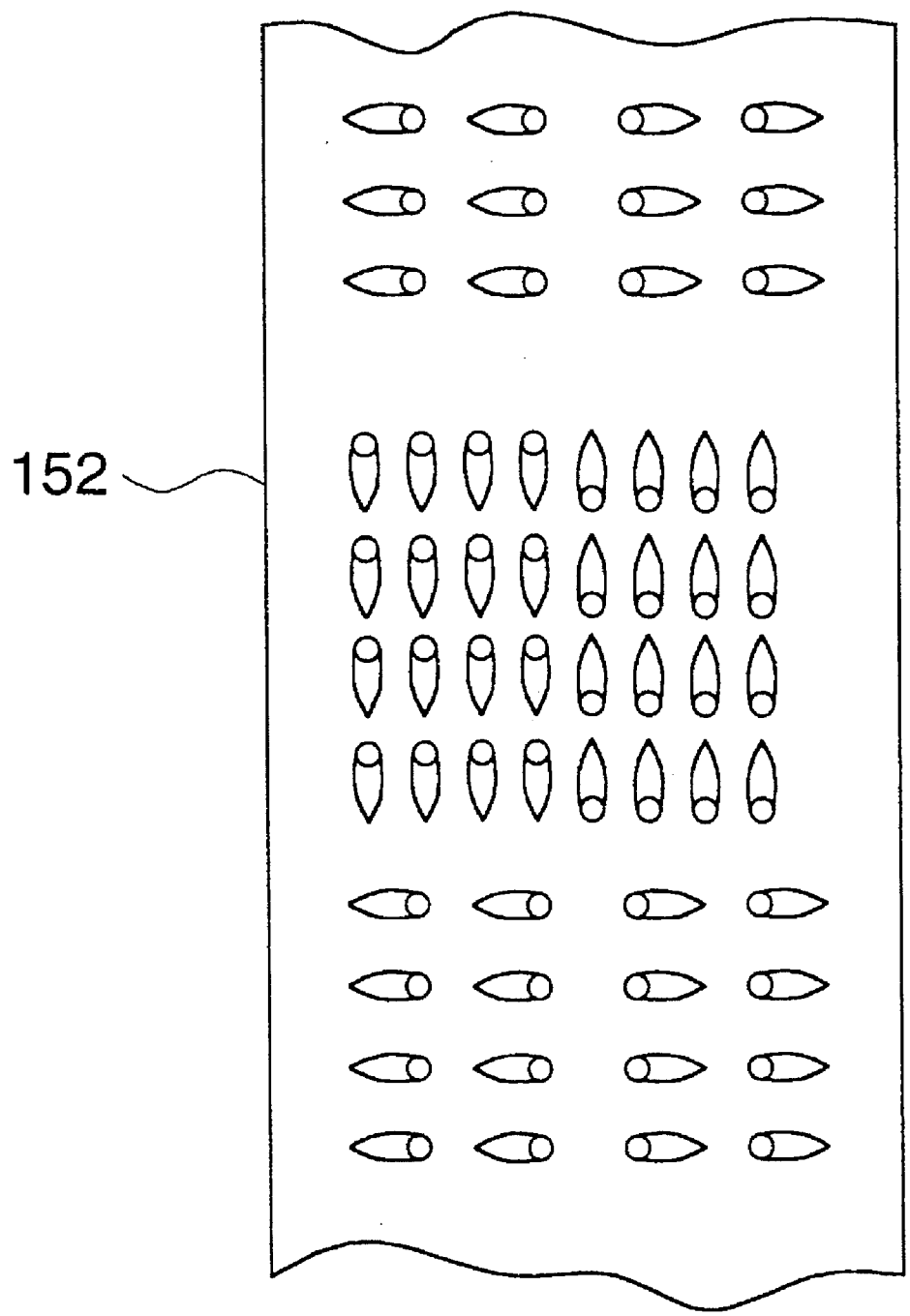
FIG. 29 is a view showing an example in which the above artificial cilia type actuator is provided to a stator.

In FIG. 27, a stator 152, on the inner circumferential surface of which an artificial cilia actuator 151 is attached, is provided outside of the movable lens 112. Various types of artificial cilia actuator 151 have been developed until now. For example, as illustrated in FIG. 28, a heater 151a is embedded in a stator 152, and a cilia-like bimetal 151b is connected with the heater 151a. When the heater 151a is energized with current and heated, the bimetal 151b is heated, so that the configuration of the liner bimetal 151b is changed to a curve. The artificial cilia actuators 151 are disposed as illustrated in FIG. 29 in the following manner. The actuators 151 are disposed so that they can be respectively curved in two directions opposite to the circumferential direction of the stator 152, and also the actuators 151 are disposed so that they can be respectively curved in two directions opposite to the optical axis direction. That is, the artificial cilia actuators 151 are appropriately divided into four blocks. In accordance with the necessity, the actuators 151 of a predetermined block is periodically energized with current so that the actuators can be curved in the circumferential direction. In this way, the movable lens 112 is moved in a direction in which the actuators can be returned from a curved shape to a linear shape. Due to the foregoing, the movable lens 112 is rotated around the optical axis so that a light amount can be controlled. At the same time, the movable lens 112 is linearly moved so that automatic focus control can be carrier out.

Concerning the artificial cilia type actuator having another type drive system, for example, the following actuator is provided. Radially divided resilient tubes are combined so as to form a cilia member, and pressure of fluid to be applied to each resilient tube is adjusted. In this way, the artificial cilia type actuator is curved in an appropriate direction. It is possible that the movable lens is rotated around the optical axis and moved in the optical axis direction when the curving direction of the actuator is changed.

As explained above, according to the present invention, the lens is used as a member for driving light amount control members. When the progressive wave type motor or a microactuator is used, the camera size can be reduced as possible, and further the number of parts can be reduced and the cost can be reduced.

With reference to the accompanying drawings, an example of the present invention will be explained as follows.

Figure 30:
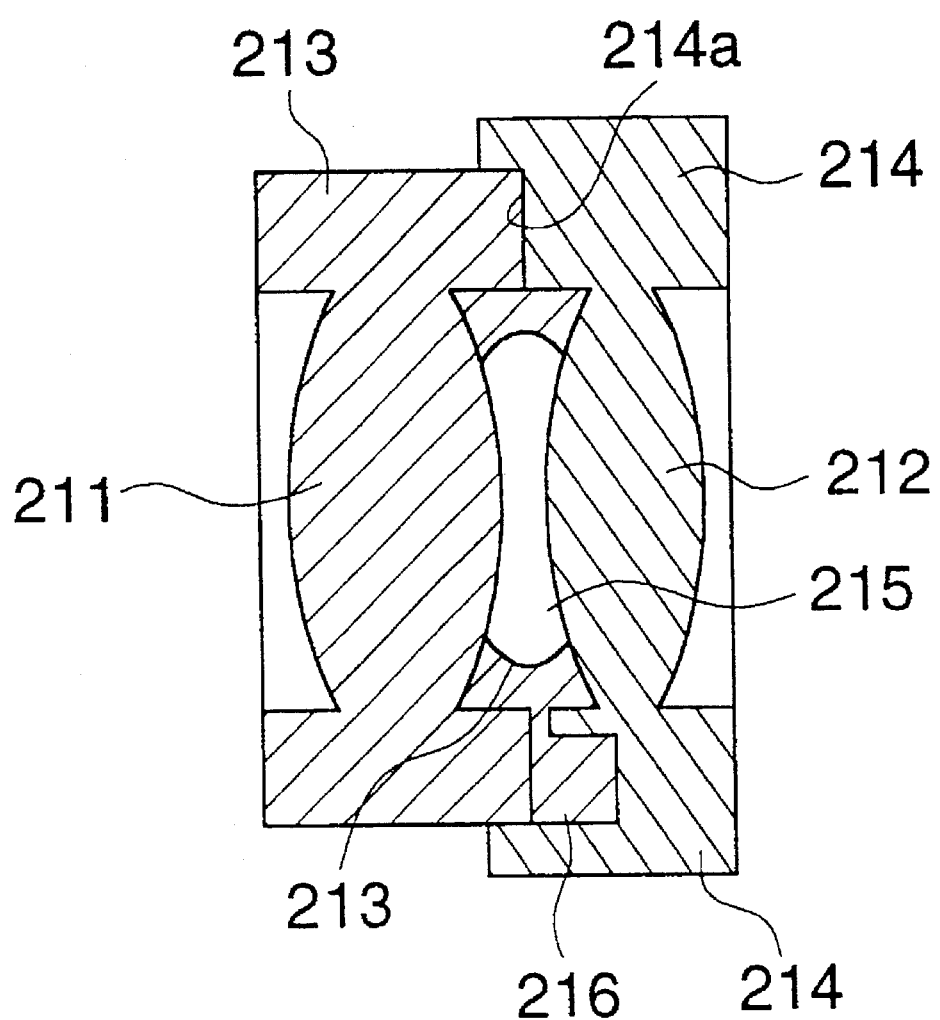
FIG. 30 is a sectional view showing the light amount control unit to accomplish the third object of the present invention.
Figure 31:
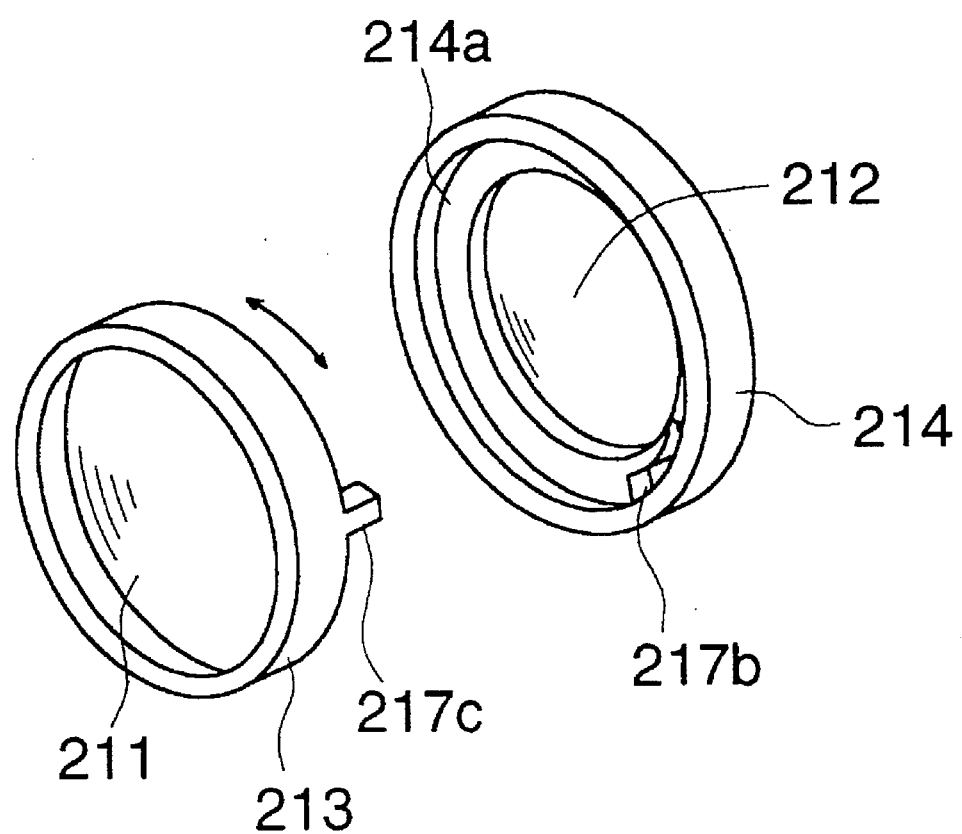
FIG. 31 is an exploded perspective view showing the light amount control unit of the present invention.

FIGS. 30 and 31 are views showing an example of the present invention. In this example, a pair of lenses 211, 212 are provided which are opposed to each other. In the peripheries of the lenses 211, 212,, lens barrels 213, 214 are integrally provided. With a cutout portion 214a formed on the opposing surface of one 214 of the lens barrels, an outer circumferential surface of the other lens barrel 213 is engaged. Therefore, the lens barrels 213, 214 can be relatively rotated around the optical axis.

This pair of opposing lens members 211, 212 compose a portion of a plurality of lens groups (not shown) of the diaphragm unit of a camera. In this case, one lens member 211 is disposed on the photographic object side, and the other lens member 212 is disposed on the film side. It is possible to form the lens members 211, 212 differently from the lens barrels 213, 214, however, it is also possible to form the lens members 211, 212 integrally with the lens barrels 213, 214.

A closed cavity portion 215 is formed between the opposing surfaces of the lens members 211 and 212. A side section of the cavity portion 215 is formed in such a manner that a distance between the opposing lens surfaces is reduced as it comes to the center from the periphery, which is illustrated in FIG. 30. Therefore, a portion of the light shielding fluid 216 flowing into the cavity portion 215 is directed from the periphery to the center by the action of surface tension. Accordingly, the following combinations of the lenses 211 and 212 satisfy the above condition. A convex lens is combined with anther convex lens, or alternatively a convex lens is combined with a concave lens, the radius of curvature of which is larger than that of the convex lens.

The light shielding fluid 216 is injected in the cavity portion 215. When a portion of the injected light shielding fluid 216 flows from the periphery to the center, an area of the light transmitting portion 216a formed at the center is reduced. For example, since mercury (Hg) has light shielding properties and its surface tension is high, mercury is used for the light shielding fluid 216. Except for mercury, a substance may be used, in which a fluid having high surface tension and a fluid having light shielding properties are mixed.

In the case where a problem is caused in terms of reflection of light when mercury is used for the shielding fluid, it is preferable to use a fluid into which pigment, dye or metallic powder, the color of which is, for example, black, is added so that the fluid exerts the light shielding function.

On the opposing surface of one lens barrel 214, a pump chamber 217b communicating with the cavity portion 215c through the passage 217a is formed, and the light-shielding fluid 216 is stored in the pump chamber 217b. On the opposing surface of the other lens barrel 213, a blade 217c is provided which engages with and slides in the pump chamber 217b, so that the light-shielding fluid 216 in the pump chamber 217b is injected into the cavity portion 215. As described above, the pump means is composed of the pump chamber 217b, blade 217c and passage 217a.

The outer circumferential surface of the lens barrel 213 formed integrally with the lens member 211 is magnetized, so that the lens barrel 213 itself functions as a rotor of the motor not shown in the drawing. Therefore, the lens barrel 213 can be rotated together with the lens 211. In this way, the drive means is composed of the lens barrel 213 and the motor. When the drive means is controlled by a control unit (not shown), a rotational angle of the lens barrel 213 is controlled. As a result, an amount of light transmitting through the light transmitting portion 216a can be controlled. As described above, when the lens barrel 213 itself is rotated as a rotor of the motor, the entire diaphragm unit can be made compact and the weight can be reduced.

Figure 34:
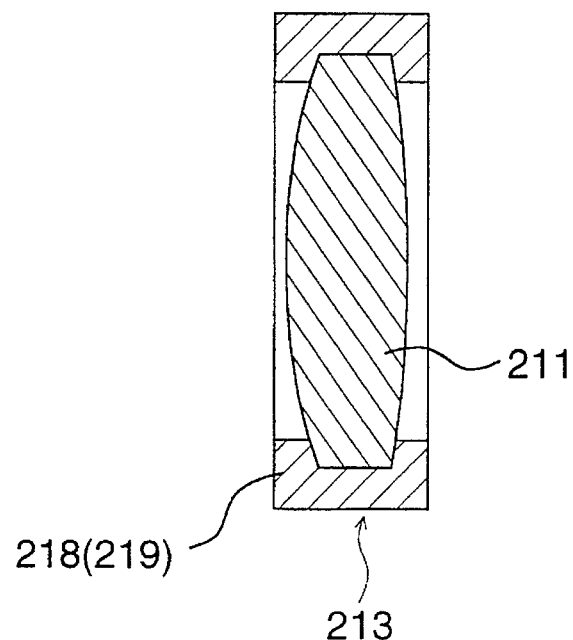
FIG. 34 is a sectional view showing another example of the present invention.
Figure 35:
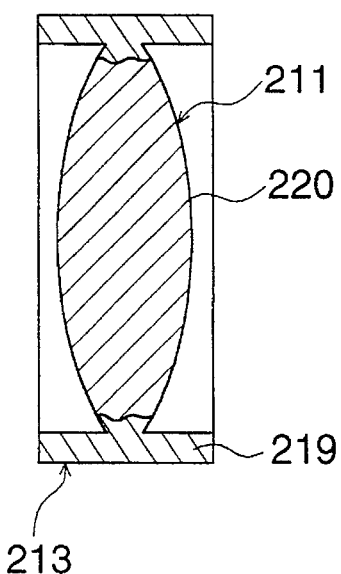
FIG. 35 is a sectional view showing another example of the present invention.

In this connection, the outer circumferential surface of the lens barrel 213 can be magnetized in the following manner: As illustrated in FIG. 34, magnetic powder 218 is sintered on the outer circumference of the lens member 211. Alternatively, magnetic powder 219 is subjected to injection molding so as to form the lens barrel 213. Alternatively, as illustrated in FIG. 35, transparent resin 220 composing the lens member 211 and magnetic resin 219 composing the lens barrel 213 are simultaneously subjected to two-color formation, so that the lens member 211 and lens barrel 213 can be integrally formed.

Figure 36:
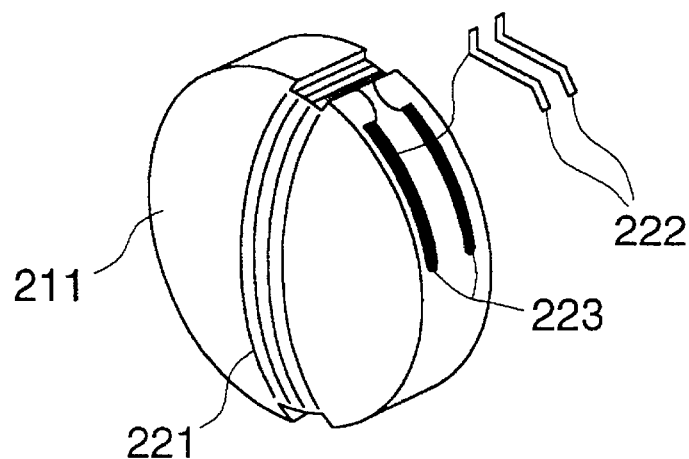
FIG. 36 is a sectional view showing another example of the present invention.
Figure 37:
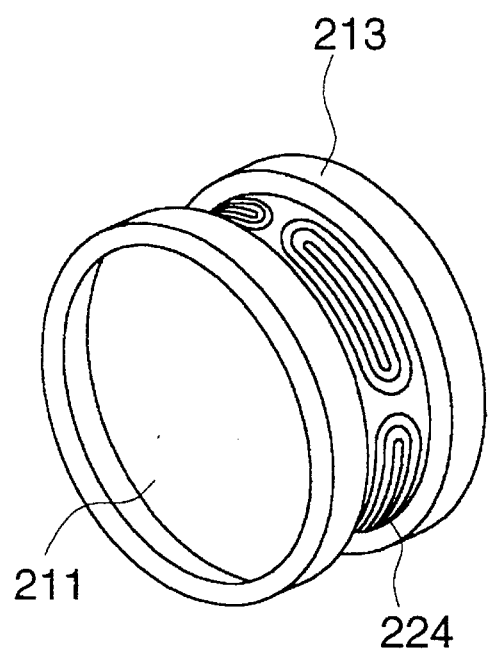
FIG. 37 is a sectional view showing another example of the present invention.

As illustrated in FIG. 36, a coil may be formed on the lens member 211 by means of a transparent pattern 221 which is commonly used for the wiring of liquid crystal, and electric power may be supplied through a brush 222. In order to supply electric power even while the lens member 211 is being rotated, the electric pattern 223 is provided on the circumferential surface of the lens member 211 over a predetermined length. Also, as illustrated in FIG. 37, the lens barrel 213 and lens member 211 are integrally formed, and a coil pattern 224 may be adhered onto the outer circumferential surface of the lens barrel 213.

Next, with reference to FIGS. 32 and 33, the mode of operation of this example will be explained as follows.

Figure 32:
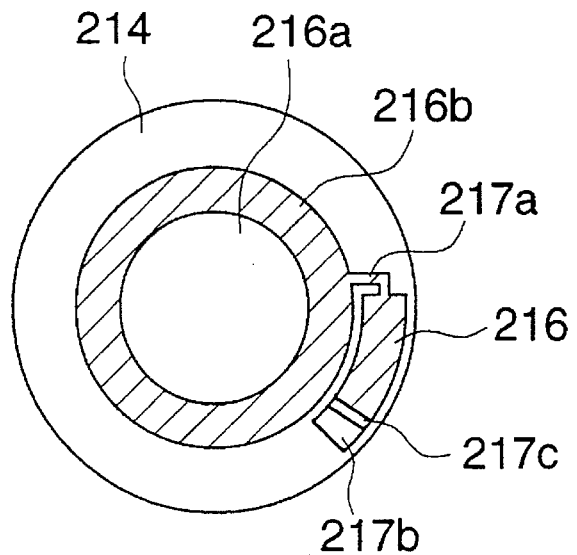
FIG. 32 is a sectional view showing the circumstances in which the light transmitting portion area is extended when the light amount control unit of the present invention is activated.

FIG. 32 shows a condition of the diaphragm unit in which the light transmitting portion 216a provided between the lens members is fully opened. Under the condition illustrated in FIG. 32, the pump chamber 217b is still filled with light-shielding fluid 216, so that only a portion of the light-shielding fluid 216 flows into the cavity portion 215. Therefore, an area of the light transmitting portion 216a is larger than that of the light-shielding portion 216b.

Figure 33:
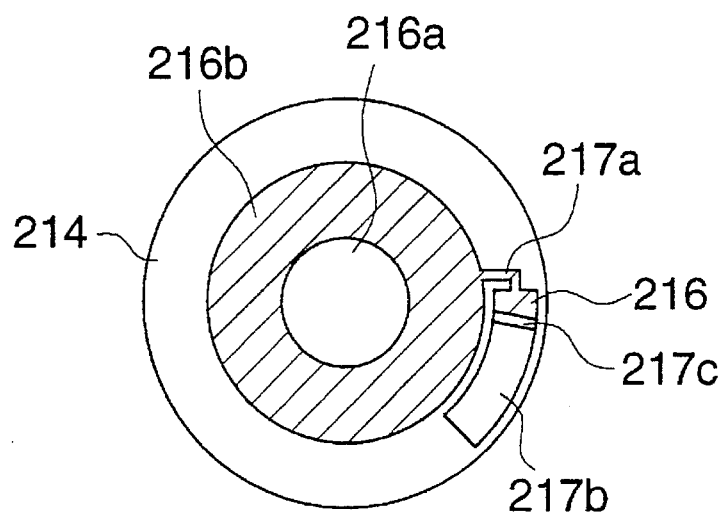
FIG. 33 is a sectional view showing the circumstances in which the light transmitting portion area is reduced when the light amount control unit of the present invention is activated.

In order to regulate an amount of light passing through the light transmitting portion 216a formed between the lens members, the operation is carried out in the following manner:

As illustrated in FIG. 33, one of the lens barrels 213 is rotated together with the lens mender 211. Then the blade 217c formed on the opposing surface of the lens barrel 213 slides in the pump chamber 217b, so that the light-shielding fluid 216 in the pump chamber 217b is pushed out and injected into the cavity portion 215. A side section of the cavity portion 215 is formed in such a manner that a distance between the opposing lens surfaces is reduced as it comes to the center from the periphery. Therefore, a portion of the injected light-shielding fluid 216 flows from the periphery of the cavity portion 215 to the center by the action of the surface tension of the fluid. Then an approximately cylindrical light transmitting portion 216a is formed at the center, and a light-shielding portion 216b filled with the light shielding fluid 216 is formed in the periphery. In accordance with an increase of the amount of injected light-shielding fluid 216, the area of the light-shielding portion 216b is increased, and at the same time the area of the light transmitting portion 216a is decreased. In this way, when an amount of injected light-shielding fluid 216 is changed, an amount of light passing through the light transmitting portion 216a can be controlled.

It is possible to employ the construction in which the aforementioned electro-theological fluid is used for this light shielding fluid.

In this case, a pump chamber 217b separated by the blade 217c is not filled with the light-shielding fluid 216, and it is possible that the pump chamber 217b is communicated with the atmosphere at all times. However, when compressed gas is injected into the pump chamber 217b, the light-shielding fluid 216 can be smoothly pushed out into the cavity portion 215 by the blade 217c.

As described above, when one of the lens barrel 213 is rotated together with the lens member 211 and a rotational angle of the lens barrel 213 is controlled, an amount of injected light-shielding fluid 216 can be easily controlled, so that an amount of light passing through the light transmitting portion 216a can be controlled. Accordingly, the entire diaphragm unit can be made compact and the weight can be reduced. Further, the number of parts can be reduced. Accordingly, the costs can be lowered.

Figure 38:
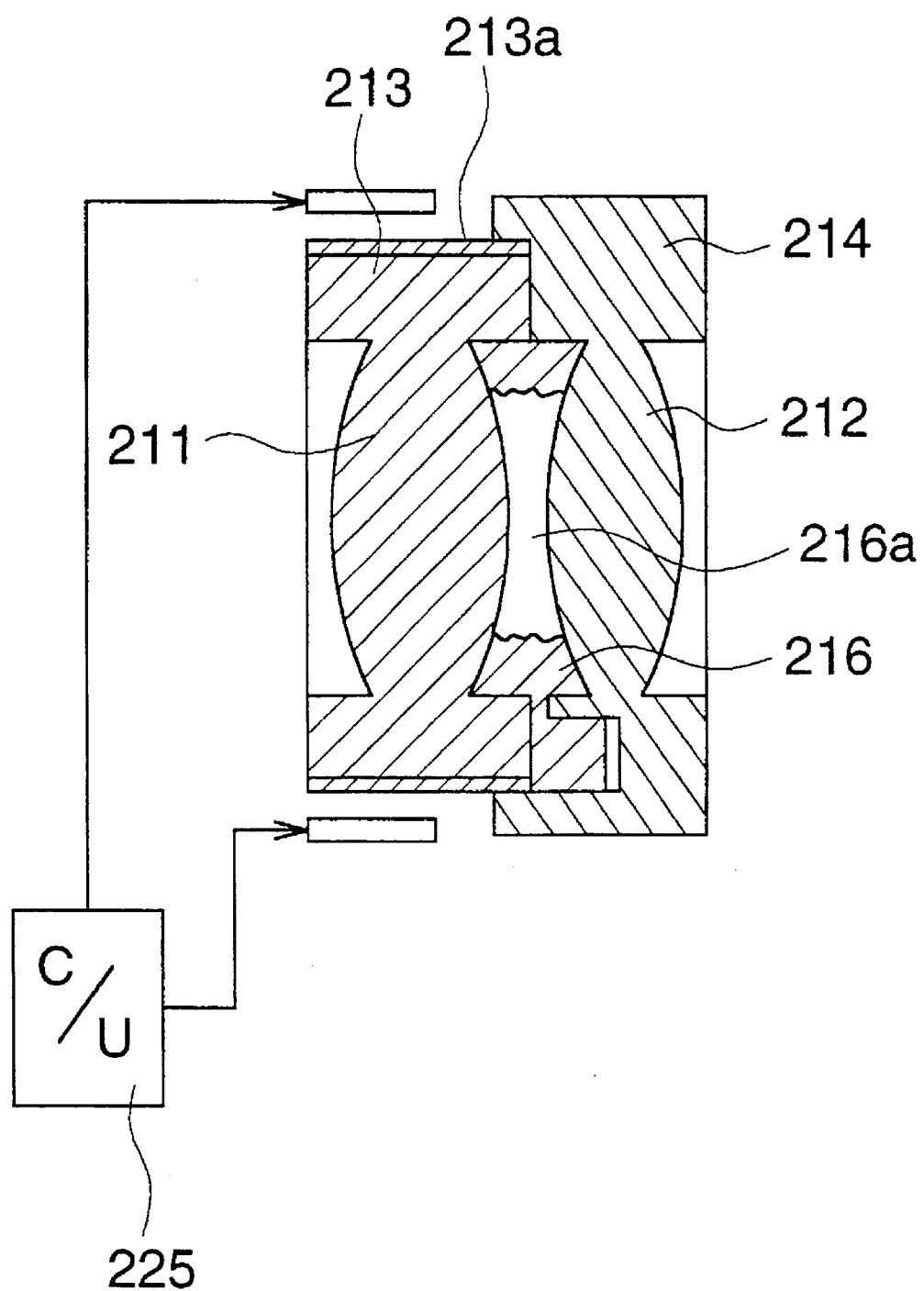
FIG. 38 is a sectional view showing another example of the present invention.

Next, with reference to FIG. 38, another example will be explained as follows.

In this example, when the magnetic field is changed, the lens barrel 213 is minutely oscillated in the rotational direction. Except for that, the construction of this example is the same as that of the examples described before, and the like parts are identified by the same reference character, and the explanation will be omitted here.

In this example, the operation is performed in the following manner:

In accordance with a command given by the control unit 225 which is an oscillation means, a magnetic field is changed which is generated around the magnetic body 213a provided on the circumferential surface of the lens barrel 213, so that the light-shielding fluid 216 is oscillated through the lens barrel 213.

Usually, in order to prevent the occurrence of unnecessary reflection, an inner circumferential surface of the lens barrel 213 is coated black. Alternatively, minute steps are formed on the inner circumferential surface. Further, the inner circumferential surface is flocked. In this example, the inner circumferential surface of the lens barrel is the same as the circumferential surface of the light transmitting portion 216a formed by the light shielding fluid 216. Therefore, when the circumferential surface of the light transmitting portion 216a is made uneven so that unnecessary reflected light is diffused by the uneven surface, the occurrence of flare and ghost can be prevented.

In the above examples, the light amount control unit of the present invention is applied to a diaphragm unit used for a camera. However, the present invention is not limited to the specific example, and it is possible to apply the present invention to a shutter unit used for exposure operation of a camera.

As explained above, the present invention is to provide an optical system control unit comprising: a pair of lens members provided so that they can be relatively rotated around the optical axis; a cavity portion formed between the opposed lens surfaces, the sectional side profile of the cavity portion being formed in such a manner that a distance between the lens surface and the cavity surface opposed to the lens is gradually reduced as it proceeds from the periphery to the center; a light shielding fluid injected into the cavity portion, the light shielding fluid reducing a light transmission area formed at the center as an injection amount of the light shielding fluid is increased; a drive means for driving one of the lens members; a pump chamber formed in the periphery of one of the lens members, the pump chamber being communicated with the cavity portion; a blade member formed in the periphery of the other lens member, the blade member sliding in the pump chamber; and a pump means for charging the light shielding fluid from the pump chamber into the cavity portion and discharging the light shielding fluid from the cavity portion. Accordingly, the entire unit can be made compact, and the weight can be reduced. Further, the number of parts can be reduced, and the costs can be lowered.

In the case where an oscillating means for oscillating the light-shielding fluid in the cavity portion is provided, the circumferential surface of the light transmitting portion formed in the cavity is waved so that the surface becomes uneven and unnecessary reflection light is diffused. Accordingly, the occurrence of flare and ghost can be prevented.

What is claimed is:

1. A mechanism to regulate a light amount passing through a lens, comprising:

a first lens rotatable around a rotation axis thereof, wherein the first lens is arranged to face a second lens coaxially and to form a gap portion therebetween in such a manner that a distance between said first lens and said second lens in the gap portion becomes gradually smaller from a periphery to a center of said first lens and said second lens;

a driver to rotate the first lens;

a regulator having an adjustable aperture through which a light amount passing through the first lens is regulated, wherein the regulator includes a light shielding fluid which is in the gap portion so as to form an aperture by its surface tension and a pump which regulates an amount of light shielding fluid in the gap portion;

a linkage to link the first lens and the regulator whereby the regulator changes the size of the adjustable aperture in accordance with a rotated position of the first lens and the linkage links the rotatable lens to the pump, whereby the pump regulates the amount of light shielding fluid so as to change the size of the aperture in accordance with the rotated position of the rotatable lens; and a vibrator to vibrate the light shielding fluid in the gap portion.

2. The optical device of claim 1 further comprising a lens supporter to support the lens unit in such a manner that the lens unit is movable in an axial direction thereof so as to focus an image.

3. An optical device to regulate a light amount passing through a lens unit, comprising:

a lens unit including a first lens and a second lens which are arranged coaxially along an optical axis;

a light amount regulator provided between the first lens and the second lens and having an adjustable aperture by which a light amount passing through the first lens and the second lens is regulated;

a driver to cause rotation of the first lens and the second lens relative to each other;

a mechanical connection between the light amount regulator and each of the first lens and the second lens whereby the regulator receives the rotation from the mechanical connection and the size of said aperture is adjusted in accordance with said rotation.

4. The optical device of claim 3 wherein the first lens is a rotatable lens and the second lens is a fixed lens.

5. The optical device of claim 4 wherein the light amount regulator is a plate-like diaphragm which is connected to the rotatable lens and the fixed lens so that the diaphragm adjusts the size of the aperture in accordance with said rotation.

6. The optical device of claim 4 wherein the light amount regulator includes a rubber diaphragm having an aperture and a pump to charge fluid into and discharge the fluid from the rubber diaphragm so that a size of the aperture of the rubber diaphragm is adjusted, and wherein the rubber diaphragm and the pump are provided to the fixed lens and the pump is linked with the rotatable lens so that the pump is actuated by said rotation.

7. The optical device of claim 4 wherein a gap portion is formed between the rotatable lens and the fixed lens in such a manner that the gap portion becomes gradually smaller from a periphery to a center of said rotatable lens and said fixed lens, the light amount regulator includes a light shielding fluid which is injected into the gap portion so as to form an aperture by its surface tension and a pump adapted to regulate an amount of the light shielding fluid in the gap portion, the pump being linked with the rotatable lens, whereby the pump regulates the amount of light shielding fluid so as to change the size of the aperture in accordance with the said rotation.

8. The optical device of claim 7 wherein the light shielding fluid is mercury.

9. The optical device of claim 7 further comprising a vibrator to vibrate the light shielding fluid in the gap portion.

10. The optical device of claim 3 wherein the driver is a motor comprising stator and a rotor, and the rotatable lens is the rotor.

11. The optical device of claim 10 wherein the motor is a progressive wave type motor.

12. The optical device of claim 10 wherein the motor is a microactuator.

13. The optical device of claim 3 further comprising a lens supporter to support the lens unit in such a manner that the lens unit is movable in an axial direction thereof so as to focus an image.

* * * * *